US012743677B2

(12) United States Patent
Subramanian

(10) Patent No.: US 12,743,677 B2
(45) Date of Patent: Sep. 22, 2026

(54) MANAGING A FLEET OF VEHICLES

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/110,303

(22) PCT Filed: Sep. 20, 2022

(86) PCT No.: PCT/EP2022/076043
§ 371 (c)(1),
(2) Date: Mar. 10, 2025

(87) PCT Pub. No.: WO2024/061446
PCT Pub. Date: Mar. 28, 2024

(65) Prior Publication Data
US 2026/0141355 A1 May 21, 2026

(51) Int. Cl.
*G06Q 10/20* (2023.01)
*G06Q 10/04* (2023.01)
*G07C 5/00* (2006.01)

(52) U.S. Cl.
CPC ............. *G06Q 10/20* (2013.01); *G06Q 10/04* (2013.01); *G07C 5/008* (2013.01)

(58) Field of Classification Search
CPC ......... G06Q 10/20; G06Q 10/04; G07C 5/008
See application file for complete search history.

(56) References Cited

U.S. PATENT DOCUMENTS 9,056,556 B1 * 6/2015 Hyde ...................... B60L 58/20
10,894,484 B2 * 1/2021 Han ........................ B60L 53/67
(Continued)

FOREIGN PATENT DOCUMENTS

CA 3005183 A1 * 11/2018 .............. E02F 3/142
DE 102012220338 A1 * 5/2013 ......... G05B 23/0278
(Continued)

OTHER PUBLICATIONS

CATL "CATL Launches Battery Swap Solution EVOGO Featuring Modular Battery Swapping" Jan. 18, 2022, https://www.catl.com/en/news/856.html (Year: 2022).*
(Continued)

*Primary Examiner* — Gerardo Araque, Jr.
(74) *Attorney, Agent, or Firm* — Jeffri A. Kaminski; Venable LLP

(57) ABSTRACT

A method of controlling operation of a fleet of vehicles comprising a plurality of vehicles is provided. The method acquires first sensor data from a plurality of first sensors of a first vehicle, and second sensor data from a plurality of second sensors of a second vehicle; processes the first sensor data using a first vehicle dynamics model to estimate at least one first vehicle operating cost parameter value related to operation of the first vehicle; processes the second sensor data using a second vehicle dynamics model to estimate at least one second vehicle operating cost parameter value related to operation of the second vehicle; processes the first and second vehicle operating cost parameter values using a reinforcement learning model to estimate a fleet operating cost parameter value; and determines a recommended component redistribution of the first vehicle to the second vehicle to optimize the estimated fleet operating cost parameter value.

16 Claims, 9 Drawing Sheets

(56) References Cited

U.S. PATENT DOCUMENTS

| | | | | |
|---|---|---|---|---|
| 2012/0303259 | A1* | 11/2012 | Prosser | B60L 53/57 701/400 |
| 2015/0336671 | A1* | 11/2015 | Winn | G05D 1/0202 701/3 |
| 2016/0039295 | A1* | 2/2016 | Madurai-Kumar | B60L 53/64 320/109 |
| 2016/0078695 | A1 | 3/2016 | McClintic et al. | |
| 2017/0146354 | A1* | 5/2017 | Boss | G01C 21/3438 |
| 2018/0197355 | A1 | 7/2018 | Remboski | |
| 2018/0259952 | A1* | 9/2018 | Delp | G06Q 50/40 |
| 2020/0074414 | A1* | 3/2020 | Restum | G06Q 10/20 |
| 2021/0081907 | A1 | 3/2021 | Solomon et al. | |
| 2021/0389145 | A1* | 12/2021 | Liu | B60L 3/12 |
| 2022/0198931 | A1* | 6/2022 | Dayal | G07C 5/085 |

FOREIGN PATENT DOCUMENTS

| | | | | |
|---|---|---|---|---|
| DE | 102021103005 | A1 * | 8/2021 | G01N 3/58 |
| WO | WO-2018013526 | A1 * | 1/2018 | G01C 21/34 |
| WO | WO-2019161409 | A1 * | 8/2019 | G06Q 10/06315 |

OTHER PUBLICATIONS

Emobility "Battery swapping and the alternatives", Aug. 8, 2022, https://web.archive.org/web/20220808105404/https://www.emobility-engineering.com/nio-battery-swapping/ (Year: 2022).*

Aboyd "Engine Swap for More Power—Is It Possible or Worth It", Feb. 1, 2017, https://www.aventurachryslerjeepdodgeram.com/engine-swap-more-power-possible-worth/ (Year: 2017).*

PartsTrader "Parts Trader Your Suppliers Your Parts Your Choice", Jul. 26, 2021, ttps://web.archive.org/web/20210726170320/https://www.partstrader.com/ (Year: 2021).*

Redmer A (2022), "Strategic vehicle fleet management—a joint solution of make-or-buy, composition and replacement problems". Journal of Quality in Maintenance Engineering, vol. 28 No. 2 pp. 327-349, doi: https://doi.org/10.1108/.*

Spieser, K., Samaranayake, S., Gruel, W., & Frazzoli, E. (2016). Shared-Vehicle Mobility-on-Demand Systems: A Fleet Operator's Guide to Rebalancing Empty Vehicles (Year: 2016).*

Ahmad, F., Saad Alam, M., Saad Alsaidan, I. and Shariff, S.M. (2020), Battery swapping station for electric vehicles: opportunities and challenges. IET Smart Grid, 3: 280-286. https://doi.org/10.1049/iet-stg.2019.0059 (Year: 2020).*

International search report and Written Opinion of the International Searching Authority in corresponding International Application No. PCT/EP2022/076043 mailed May 15, 2023 (11 pages).

* cited by examiner

MANAGING A FLEET OF VEHICLES

CROSS-REFERENCE TO RELATED APPLICATIONS

This application is a U.S. National Stage application of PCT/EP2022/076043, filed Sep. 20, 2022 and published on Mar. 28, 2024, as WO 2024/061446, all of which is hereby incorporated by reference in its entirety.

TECHNICAL FIELD

The disclosure relates generally to a method of controlling operation of a fleet of vehicles. In particular aspects, the disclosure relates to use of equipment within the fleet of vehicles.

The disclosure can be applied in heavy-duty vehicles, such as trucks, buses, and construction equipment.

BACKGROUND

A fleet of vehicles, such as trucks, includes a certain number of vehicles which may be different types of vehicles and/or vehicles used for different purposes. Managing more than one vehicle, particularly a fleet of vehicles where vehicles may be assigned to perform different missions, is a challenging task. Indeed, it requires considering multiple parameters and keeping track of conditions, operations, and routes of multiple vehicles, which may be used in different ways and may consume fuel differently. Also, vehicle components may wear out quicker in some vehicles than in others, depending on the use, roads traveled, etc. Thus, existing approaches typically involve optimizing operation of an individual vehicle, even if that vehicle is part of a fleet.

Accordingly, there is a need in techniques for managing an entire fleet of vehicles.

SUMMARY

The object of embodiments of the present disclosure is to provide a system or controller and method for managing a fleet of vehicles, to optimize use of equipment, e.g., trucking equipment, in the fleet, by minimizing fleet operating costs. Although approaches to improving costs of operation of a single vehicle exist, managing costs of operation of the entire fleet of vehicles remains to be a challenge.

Accordingly, a system or controller and method are provided that allow considering a state of various components of individual vehicles in the fleet, to generate a component redistribution for the vehicles in the fleet which improves or optimizes operation of the entire fleet. The component redistribution may include a recommendation to replace a component or part of one vehicle with a component or part from another vehicle. Thus, components including, e.g., brakes, components of a transmission system, components of a suspension system, components of a steering assembly, tires, and others, may be redistributed or exchanged among the vehicles. The components may be redistributed, e.g., in a workshop or in another facility. In some cases, one or more components may be redistributed at a location of the vehicle.

A recommended component redistribution may be generated based on a current state of health (i.e. operational condition) of each vehicle's components, historical driver behavior, and based on whether the redistribution would improve the operation of the entire fleet, in terms of improved values of fleet operating cost parameters, such as, e.g., fuel economy, vehicles downtime, ride comfort, and equipment wear. Thus, even though it is possible that, for certain vehicles, the resulting improvement is small or there may even be no improvement, for other vehicles and, notably, for the entire fleet, fleet operating costs will be improved as a result of the component redistribution.

In embodiments in accordance with the present disclosure, a reinforcement learning (RL) model may be used to manage a fleet of vehicles. The RL model, which may be generated and updated based on implementation of the recommended component redistribution, such as based on operation of the vehicles, their loads, planned routes, and driver behavior. An updated, subsequent recommended component redistribution may be generated using sensor data acquired from vehicles in the fleet, based on performance of the vehicles with the recommended, and implemented, component redistribution.

The system, such as a fleet controller, and method in accordance with embodiments of the present disclosure provide an advantage of managing a fleet of vehicles in an improved manner, to maximize fuel economy, minimize downtime and thereby increase uptime or availability, and reduce equipment wear. Sustainability of the fleet may thus be improved. In addition, a ride comfort may be improved. Thus, the vehicles in the fleet are managed together to allow efficient use of the vehicles and their components, which increases a lifetime and cost-efficiency of the entire fleet. The present approach is more holistic since the fleet as a whole is considered when making machine-learning based decisions regarding component redistribution. An owner of the fleet can thus manage the fleet in a more cost-efficient manner, such that a lifetime and reliability of vehicles is improved and the costs associated with operating and managing the entire fleet are reduced.

According to an aspect of the disclosure, a method of controlling operation of a fleet of vehicles is provided. The method comprises acquiring first sensor data from a plurality of first sensors of a first vehicle of a fleet of vehicles, and second sensor data from a plurality of second sensors of a second vehicle of the fleet of vehicles, the first vehicle comprising a plurality of first components and the second vehicle comprising a plurality of second components; processing the first sensor data using a first vehicle dynamics model to estimate at least one first vehicle operating cost parameter value related to operation of the first vehicle; processing the second sensor data using a second vehicle dynamics model to estimate at least one second vehicle operating cost parameter value related to operation of the second vehicle; processing the first vehicle operating cost parameter value and the second vehicle operating cost parameter value using a reinforcement learning model to estimate at least one fleet operating cost parameter value related to operation of the fleet of vehicles; and determining a recommended component redistribution of the first vehicle to the second vehicle to optimize the at least one estimated fleet operating cost parameter value.

According to an aspect of the disclosure, the object is achieved by an inventive concept disclosed herein. Components' status and driver behavior for all vehicles in the fleet may be considered together in machine-learning models that are used to generate component redistributions for the vehicles in the fleet that optimizes the efficiency of the entire fleet. Hereby, a technical effect includes providing a method and a system, such as a fleet dynamics controller, to manage and control operation of the fleet of vehicles and components placement in the fleet, which results in advantages of increasing fuel economy and operational efficiency of the fleet of vehicles, reducing downtime of the vehicles in the fleet, reducing wear of the vehicle's components, increasing ride comfort, as well as increasing components' durability and lifetime thereby increasing efficiency and reducing costs of maintenance and operation of the entire fleet.

In certain examples, the method may further comprise sending the recommended component redistribution at least to the first vehicle and the second vehicle.

In certain examples, the method may further comprise acquiring subsequent first sensor data from the plurality of first sensors of the first vehicle with a first redistributed component of the component redistribution, and subsequent second sensor data from the plurality of second sensors of the second vehicle with a second redistributed component of the component redistribution; generating an indication indicating whether or not the recommended component redistribution optimized the at least one estimated fleet operating cost parameter value; and determining, by the reinforcement learning model, a subsequent recommended component redistribution of the first vehicle to the second vehicle, the subsequent recommended component redistribution optimizing the at least one estimated fleet operating cost parameter value.

In certain examples, the indication may be generated by a feedback module that provides the indication to the reinforcement learning model.

In certain examples, if the indication indicates that the recommended component redistribution optimized the at least one estimated fleet operating cost parameter value, the subsequent recommended component redistribution may be determined using the recommended component redistribution.

In certain examples, if the indication indicates that the recommended component redistribution did not optimize the at least one estimated fleet operating cost parameter value, the subsequent recommended component redistribution may be determined using an alternative recommended component redistribution.

In certain examples, the first vehicle dynamics model may estimate the value of the at least one first vehicle operating cost parameter value by considering that a first component from the plurality of first components of the first vehicle is replaced with a corresponding second component of the second vehicle, and wherein the second vehicle dynamics model may estimate the value of the at least one second vehicle operating cost parameter value by considering that the second component from the plurality of second components of the second vehicle is replaced with the corresponding first component of the first vehicle.

In certain examples, the first vehicle dynamics model and the second vehicle dynamics model may be included in a simulator.

In certain examples, the method may further comprise providing the recommended component redistribution from the reinforcement learning model to a fleet management controller that generates a signal instructing implementation of the recommended component redistribution of the first vehicle to the second vehicle.

In certain examples, the first sensor data comprises driver input signals of the first vehicle; and the second sensor data comprises driver input signals of the second vehicle.

In certain examples, the first sensor data may be processed to determine one or more of an application of the first vehicle, a route for the first vehicle, and a driver style classification of a driving style of a driver of the first vehicle; and the second sensor data may be processed to determine one or more of an application of the second vehicle, a route for the second vehicle, and a driver style classification of a driving style of a driver of the second vehicle.

In certain examples, the first sensor data may be processed to generate a health status of at least one subsystem of the first vehicle; and the second sensor data may be processed to generate a health status of at least one subsystem of the second vehicle.

In certain examples, the first vehicle dynamics model may use one or more of the application of the first vehicle, the route for the first vehicle, the driver style classification of the driving style of the driver of the first vehicle, and the health status of the at least one subsystem of the first vehicle to estimate the at least one first vehicle operating cost parameter value; and the second vehicle dynamics model may use one or more of the application of the second vehicle, the route for the second vehicle, the driver style classification of the driving style of the driver of the second vehicle, and the health status of the at least one subsystem of the second vehicle to estimate the at least one second vehicle operating cost parameter value.

In certain examples, the first sensor data and the second sensor data may be stored in a cloud fleet database.

In certain examples, the at least one fleet operating cost parameter value may comprise a value of one or more of fuel economy in the fleet of vehicles, operational efficiency of the fleet of vehicles, downtime of one or more vehicles in the fleet of vehicles, ride comfort of one or more vehicles in the fleet of vehicles, and a component wear of one or more vehicles in the fleet of vehicles.

In certain examples, the plurality of first components of the first vehicle may comprise one or more components of tires, a steering wheel system, a brake system, a transmission system, a suspension system, an aerodynamics system, and a powertrain system; and the plurality of second components of the second vehicle may comprise one or more components of tires, a steering wheel system, a brake system, a transmission system, a suspension system, an aerodynamics system, and a powertrain system.

According to an aspect of the disclosure, the object is achieved by providing a fleet management system comprising a fleet of vehicles comprising a plurality of vehicles and a fleet dynamics controller for controlling operation of the fleet of vehicles, the fleet management system being configured to perform the method in accordance with embodiments of the present disclosure.

According to an aspect of the disclosure, the object is achieved by providing a fleet dynamics controller for controlling operation of a fleet of vehicles, the fleet dynamics controller being configured to perform the method in accordance with embodiments of the present disclosure.

According to an aspect of the disclosure, the object is achieved by providing a computer program product comprising instructions, which, when executed on at least one processor, cause the at least one processor to carry out the method in accordance with embodiments of the present disclosure.

According to an aspect of the disclosure, the object is achieved by providing a computer-readable storage medium, having stored thereon a computer program product comprising instructions which, when executed on at least one processor, cause the at least one processor to carry out the method in accordance with embodiments of the present disclosure.

Additional features and advantages are disclosed in the following description, claims, and drawings, and in part will be readily apparent therefrom to those skilled in the art or recognized by practicing the disclosure as described herein.

There are also disclosed herein control units, computer programs, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Figure 1A:
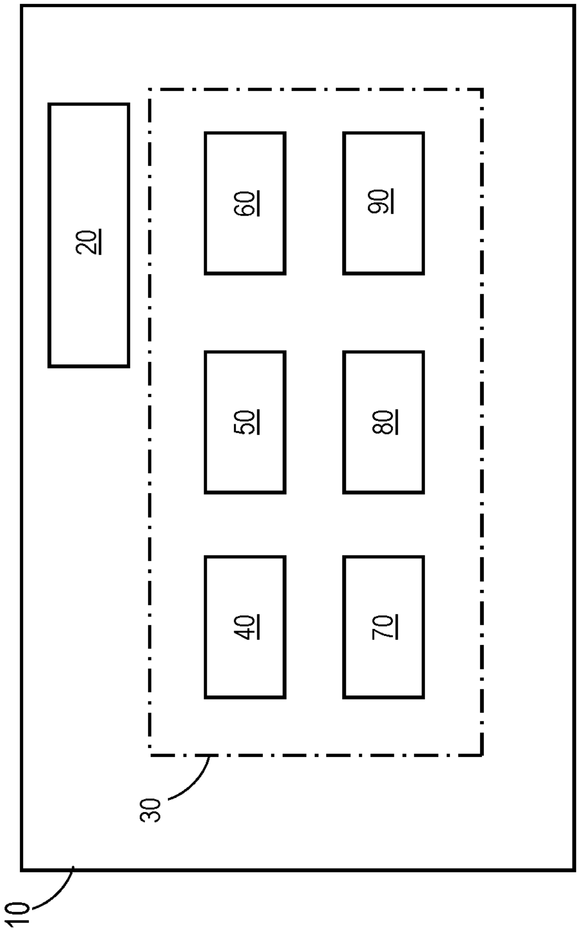
FIG. 1A is a block diagram illustrating an example of a fleet management system in which some embodiments may be implemented.

Aspects of the present disclosure relate to optimizing performance of a fleet of vehicles as a whole, in the manner that allows decreasing costs associated with operation of the fleet while simultaneously taking into consideration status of all vehicles in the fleet. In this way, management of the fleet is simplified, and operating costs of the entire fleet are reduced. Thus, rather than optimizing performance of a single vehicle and/or its components, a method and system or controller in accordance with the present disclosure allow optimization of the entire fleet, based on considering dynamic performance of the vehicles and drivers' behaviour. In this way, advantages may be achieved such as reducing downtime of vehicles and components' wear-down, and increasing fuel economy. Also, a ride comfort, including e.g. quality perception, driving pleasure, and safety, may be improved. Vehicle components, particularly those that are worn out, may cause vibrations, noise, etc., which may affect the comfort and even health of a driver or a passenger, and embodiments of the present disclosure allow improving the ride comfort.

In aspects in accordance with the present disclosure, a method of controlling operation of a fleet of vehicles is provided. The method comprises

- acquiring first sensor data from a plurality of first sensors of a first vehicle of a fleet of vehicles, and second sensor data from a plurality of second sensors of a second vehicle of the fleet of vehicles, the first vehicle comprising a plurality of first components and the second vehicle comprising a plurality of second components;
- processing the first sensor data using a first vehicle dynamics model to estimate at least one first vehicle operating cost parameter value related to operation of the first vehicle;
- processing the second sensor data using a second vehicle dynamics model to estimate at least one second vehicle operating cost parameter value related to operation of the second vehicle;
- processing the first vehicle operating cost parameter value and the second vehicle operating cost parameter value using a reinforcement learning module to estimate at least one fleet operating cost parameter value related to operation of the fleet of vehicles; and
- determining a recommended component redistribution of the first vehicle to the second vehicle to optimize the at least one estimated fleet operating cost parameter value.

In some embodiments, a dynamics of the entire fleet of vehicles is considered for optimization. Data from sensors, control units, and various input devices (collectively referred to herein as sensors) of a vehicle may be acquired for each of the vehicles in the fleet, or each of the vehicles considered in the optimization of the fleet operation. The sensor data may be processed, including in a simulation module or simulator, to determine a health status of subsystems and/or subsystems' components of the vehicle. Also, a driver (or driving) style related to the way the vehicle is operated by a certain driver may be determined, e.g., classified, along with a route information and application, i.e. use, of the vehicle. The route information may be obtained via a Global Positioning System (GPS). The route may be predicted based on a type of a mission performed by a vehicle, e.g., based on prior routes traveled by that vehicle.

The health status of subsystems and the driver style classification, as well as the application and a route, determined for each vehicle, may then be used in a vehicle simulator. The simulator employs a vehicle dynamics model that simulates, for each vehicle, performance of the vehicle with one or more of its components replaced with corresponding components from other vehicles. The simulation considers that, depending on the health of the vehicle's components and the health of other vehicle(s)' components that are considered for installation in the vehicle, the driver style, a planned route and vehicle application, different components may be expected to perform differently and wear out at a different pace in different vehicles. The performance of the vehicle, with one or more of its components replaced with components from other vehicle(s), may be assessed in the simulator to generate values of certain operating cost parameters such as, e.g., a fuel economy, wear of the components, and others. The operating cost parameters relate to efficiency of operating each vehicle in a simulated scenario when one or more of its components are replaced with components from one or more of other vehicles in the fleet.

For different fleets, different operating cost parameters may be more of interest than others. In some cases, fleet operating cost parameters may be weighed depending on a type of the fleet and tasks or missions performed or planned to be performed by the vehicles in the fleet. For example, for a fleet including such vehicles as e.g. long-haul vehicles, the fleet performance may be optimized, i.e. improved, for fuel economy. For another fleet of vehicles including e.g., refuse vehicle or mining vehicles, the fleet performance may be optimized for wear of the components of vehicles in the fleet. In some embodiments, a fleet operator or other entity may be enabled to specify which fleet operating cost parameters are to be optimized, along with weights for these parameters.

The generated values of the operating cost parameters of each vehicle may then be provided to a reinforcement learning (RL) module which is trained to estimate at least one fleet operating cost parameter value related to operation of the fleet of vehicles. In some embodiments, the RL model may determine the at least one fleet operating cost parameter value by weighing the values of the operating cost parameters of each vehicle. Thus, it may be determined how efficiently the entire fleet may be operated when some or all of its vehicles have their components redistributed to other vehicles, given the health status of these components and factors such as drivers' behavior, routes, and application or use of the vehicles. A recommended component redistribution may be generated which is estimated to optimize the estimated value of the fleet operating cost parameter.

After the recommended component redistribution is implemented in actual vehicles or in a vehicle simulator, an updated recommended component redistribution may be generated, based on determining, using subsequent sensor data, whether or not the original recommended component redistribution actually improved or optimized the estimated fleet operating cost parameter value. In this way, the recommended component redistribution may be updated based on feedback acquired from vehicles, and the RL model may further learn to provide output that optimizes values of fleet operating cost parameter(s) and thereby improves efficiency and extends lifetime of the fleet.

FIG. 1A illustrates schematically a fleet management system 10 in which some embodiments of the present disclosure may be implemented. The system 10 comprises a fleet dynamics controller 20 configured to manage a fleet 30 comprising a plurality of vehicles, such as e.g., vehicles 40, 50, 60, 70, 80, and 90. The six vehicles 40-90 are shown as an example only, since the fleet 30 may comprise fewer than six, and typically more than six vehicles. The vehicles in the fleet 30 may be of the same type, or some of them may be of a different type than others. Also, the vehicles in the fleet 30 may be assigned to perform different or similar tasks. The fleet 30 may comprise construction vehicles, long-haul vehicles including sleeper tractors, taxi cabs, rental cars, public busses, and other types of vehicles. A fleet of construction vehicles may include, e.g., excavators, concrete mixer trucks, bulldozers, asphalt pavers, asphalt rollers, dump trucks, front loaders, backhoes, graders, cranes, forklifts, conveyors, etc.

The fleet 30 may have an owner that may monitor, using one or more controllers, e.g., via a real-time GPS tracking, locations of the vehicles and driver performance, and may determine current and planned routes, as well as jobs or missions for the vehicles. The vehicles in the fleet 30 may be controlled and managed, e.g., regarding decisions related to fuel consumption by the fleet, operating efficiency of the vehicles, and possible idling of the vehicles. Conditions of the vehicles are also monitored, to determine whether to perform diagnostics, repair, and/or maintenance. For example, the fleet dynamics controller 20 and/or another controller may be used to perform remote diagnostics of the vehicles in the fleet, to enable the fleet owner to constantly monitor a vehicle's health, identifying when critical parts will reach their end of life.

Operating conditions of subsystems of the vehicles in a fleet are typically managed separately for each vehicle. For example, a vehicle may be inspected regularly or upon a certain event, and it may be determined whether any repairs or modifications are needed. However, individual vehicles in the fleet may wear out at a different pace, depending on various factors such as, e.g., a type and frequency of use, road conditions, and driver behavior. Also, there may be different demands on different vehicles in the fleet, depending on a type and length of a mission, routes, and driver behavior such as a driver's style of driving. Thus, vehicles in the fleet may have different conditions which are, although monitored, typically not considered while taking into considerations conditions of others vehicles in the fleet. At the same time, it may be more cost- and time-efficient to make decisions regarding the entire fleet.

Accordingly, embodiments herein provide a system, such as the fleet dynamics controller 20, and a method performed therein, to manage operation of the fleet of vehicles. A driver style, application, route for the vehicle, as well as a status of subsystems or their parts of vehicle are used to determine values of vehicle operating cost parameters for that vehicle. The values of the vehicle operating cost parameters of the individual vehicles may be used together to estimate values of fleet operating cost parameters, and a recommended component redistribution of a vehicle to another vehicle in the fleet may be determined, such that this component redistribution is expected to optimize the value of the fleet operating cost parameter. In this way, a solution for the entire fleet is generated which provides such advantages as improved fuel and operational efficiency, safety, and sustainability of fleet operations and fleet vehicles.

An individual vehicle in a fleet may be managed via e.g., on-board controls. In embodiments herein, for example, a vehicle dynamics of truck A tire in truck B may be computed to evaluate a fuel economy given that usage, route information and a driver's driving style are assessed for each vehicle. As an example, truck A may provide 70% fuel economy and truck B may provide 50% fuel economy with respective tires currently installed on trucks A and B. The method in accordance with the present disclosure allows estimating a fuel economy when the tires are switched among the trucks. For example, switching the tires, such that truck A has tires from truck B and truck B has tires from truck A, may result in fuel economy of 65% on both trucks (i.e., the change for truck A results in reduction of the fuel economy), but the overall gain in fuel economy may be 10%. In this way, the fuel economy of the entire fleet has been improved. Other vehicle components that may be switched among vehicles in the fleet may be a steering wheel alignment, brake pad, clutch friction material, differential, compressor, and various other components of vehicle's subsystems, as discussed in more detail below.

Figure 1B:
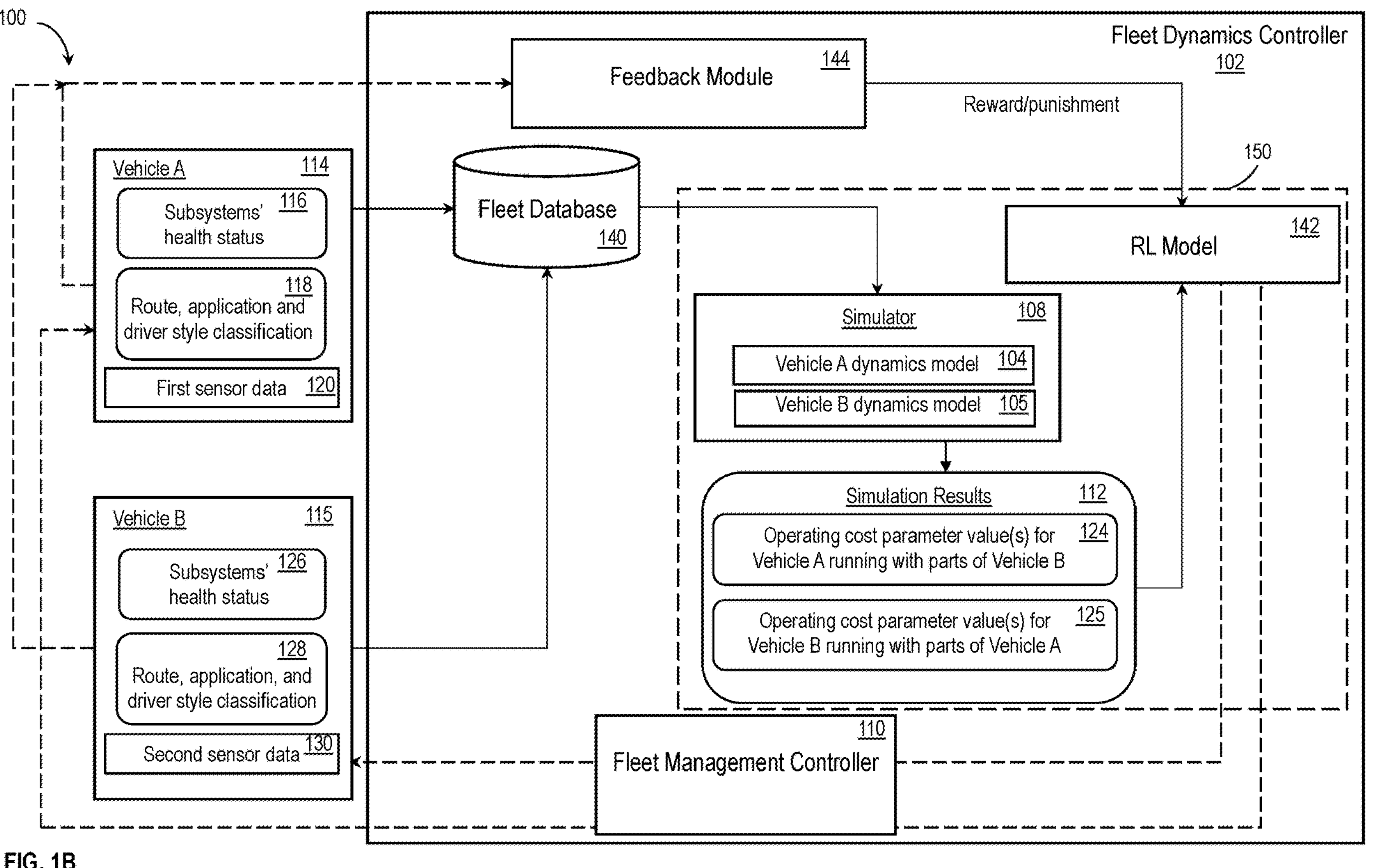
FIG. 1B is a block diagram illustrating another example of a fleet management system in which some embodiments may be implemented.

FIG. 1B illustrates an example of a fleet management system 100 in which embodiments for controlling operation of a fleet of vehicles may be implemented. The fleet management system 100 may be, e.g., a fleet management system 10 of FIG. 1A, configured to manage a fleet comprising a plurality of vehicles such as e.g. fleet 30 of FIG. 1A. As shown, the fleet management system 100 comprises a fleet dynamics module or controller 102, e.g., fleet dynamics controller 20 of FIG. 1A, which may be implemented in software, hardware, or combination thereof, and may comprise or may be executed using a local processing circuitry, such as one or more local processors, or one or more cloud processors, or using a combination thereof. The fleet dynamics controller 102 may be implemented at least in part, e.g., some of its components, as a cloud computing system.

As shown in FIG. 1B, the fleet dynamics controller 102 comprises vehicle dynamics models such as a first vehicle dynamics model 104, also referred to herein as a Vehicle A dynamics model, and a second vehicle dynamics model 105, also referred to herein as a Vehicle B dynamics model. The first vehicle dynamics model 104 and the second vehicle dynamics model 105 may be physics-based vehicle dynamics models, which may have different degrees of freedom (DoF). For example, a vehicle dynamics model may be a three- or four-DoF model. In some cases, a vehicle dynamics model may be a more complex model with more than four DoFs. As shown in FIG. 1B, the first vehicle dynamics model 104 and the second vehicle dynamics model 105 may be included in a simulation module or simulator 108 of the system 100 which may use the vehicle dynamics models to simulate performance of the vehicles, A and B in this example, in real life, which is described in more detail below. The simulator 108, such as a simulation computing environment, may in some embodiments be a remote simulator which may be executed on a cloud processor.

The fleet management system 100 also comprises representations of first vehicle A 114 and second vehicle B 115, which are referred to herein, for simplicity of description, as first and second vehicles 114, 115. The fleet management system 100 is configured to manage and control operation of actual vehicles in the fleet which are not shown in FIG. 1B, and the representations of the first and second vehicles 114, 115 are shown to illustrate data acquired from the respective actual vehicles, and information determined from the acquired data and further used for fleet management in accordance with embodiments of the present disclosure.

It should be appreciated that the fleet management system 100 represents a computer-implemented architecture for controlling operation of the fleet of vehicles that may comprise multiple vehicles, which may be of different types, and the representations of the first vehicle A 114 and second vehicle B 115 are depicted and discussed herein by way of example only.

The representations of the first and second vehicles A and B 114, 115 that (vehicles) may be controlled in accordance with aspects of the present disclosure, represent information that may be obtained by processing data acquired from the vehicles and/or related to operation of the vehicles. Thus, the first vehicle 114 is shown to include information on a health status of subsystems (Subsystems' health status) 116 of the first vehicle 114 and a route, application, and driver style classification 118 indicating a type of a route that may be traveled by the first vehicle 114, application of the first vehicle (e.g., a type of work or a mission to which the vehicle is assigned, e.g., if the vehicle is being used to transport goods, passengers, drive in an urban environment, drive off-road, etc.), and a driving style of the driver of the first vehicle 114. Similarly, the second vehicle 115 is shown to include a health status of subsystems (Subsystems' health status) 126 of the second vehicle 115 and application of the second vehicle and a route, application, and driver style classification 128 indicating a route that may be traveled by the second vehicle 115, application of the second vehicle 115, and a driving style of the driver of the second vehicle 115. The subsystems' health status may include information on a health status of a chassis system of the vehicle, as well as of various subsystems of the chassis system. For a certain vehicle, the subsystems' health status, and the application and the driver style classification may be provided by respective control units of the vehicle, e.g., as discussed below in connection with FIGS. 4 and 5.

The health status of subsystems of a vehicle may comprise information on subsystems and/or part or components or parts of subsystems of that vehicle and associated health of the subsystems and/or its components. The health status may represent a remaining lifetime and operation efficiency of the component, and it may be expressed as a percentage of the total, i.e. 100%, health.

The driving style may indicate a manner in which the vehicle is driven when operated by a certain driver, which may be expressed as numeric or non-numeric categories or groups, or as a combination thereof. It may be assumed that the same driver is driving a certain vehicle, and the driver's style may be determined, based on sensor and other data during the driver operating the vehicle, for that specific driver. In cases in which more than one driver may operate the vehicle, a driver style classification may be determined for each driver, since different drivers may have a different driving style, which may affect wear and tear of the vehicle, i.e. status of its components such as, e.g., tires, brakes, steering system, powertrain, suspension system, aerodynamics system, etc. It should be noted that the driving style may depend not only on driver's personal characteristics, but also on a type of work performed by the vehicle and routes—e.g., a long hauler vehicle for transporting goods on a highway or freeway makes much fewer stops than an excavator or a refuse collection vehicle.

In FIG. 1B, the first vehicle 114 is shown to include first sensor data 120, and the second vehicle 115 is shown to include second sensor data 130. The sensor data, measured by respective sensors and/or acquired from control units and various input devices (collectively referred to herein as sensors) of a vehicle, may be data on physical properties pertaining to operation of the vehicle. The measured sensor data may be used to determine the health status of subsystems, application of the vehicle, route classification, and the driver style classification, as discussed in more detail below. For some or all of the vehicles in the fleet, the information on one or more of the driver style classification, route, application, and the health status of subsystems may in turn be used to determine values of the vehicle's operating cost parameters. The first sensor data 120 and the second sensor data 130 may be telematics data comprising, for each individual vehicle, fuel consumption, idling time, location, speed, driving style, and vehicle faults.

Operation of the first and second vehicles, represented in the system 100 as first and second vehicles 114, 115, may be controlled, as part of controlling and managing the fleet using the fleet dynamics controller 102, via a fleet management controller 110 shown in FIG. 1B. The fleet management controller 110 may be a remote controller, and it may comprise or be associated with a console or user interface (UI) through which operation of the vehicles in the fleet may be controlled and/or through which communications with the vehicles' systems and drivers may take place. The fleet management controller 110 may be configured to automatically control the vehicles and it may be configured to receive and send instructions and/or recommendations related to changes to components and operating parameters of the vehicles. For example, the fleet management controller 110 may be configured to send recommendations or instructions to a fleet mechanics team regarding redistribution of components in accordance with a recommended component redistribution which may be an updated, or subsequent, recommended component redistribution. The fleet management controller 110 may be configured to send commands to a driver of a respective vehicle, which may be done automatically, manually, or via a combination thereof. The commands, or any other types of communications with the driver of the vehicle may be displayed, e.g., on a vehicle dashboard or may be communicated via a smartphone application. The smartphone application may be, for example, a fleet management application through which various information regarding a vehicle may be acquired automatically or by acquiring a driver input, and through which a fleet operator and drivers may communicate.

The first sensor data 120 and the second sensor data 130, which may be processed, as well as the subsystems' health status 116, and the route, application, and driver style classification 118 determined for the first vehicle and the subsystems' health status 126 and the route, application, and driver style classification 128 determined for the second vehicle may be stored in a fleet database 140, which may be a cloud data storage such as one or more cloud data storage devices in a computing cloud system. As mentioned above, the fleet dynamics controller 102 may be part of or may be a computing cloud system. In some implementations, the fleet database 140 may be a remote data storage that is remotely accessible to the fleet dynamics controller 102, e.g., via network communications.

The fleet database 140 may be configured to store any suitable data related to status and operation of the vehicles in the fleet managed by the fleet management system 100. For example, for the first vehicle 114, the fleet database 140 may store the subsystems' health status 116 comprising information on a clutch having a 50% health status and a brake having a 25% health status. For the second vehicle 115, the fleet database 140 may have the subsystems' health status 126 comprising information on a clutch having a 75% health status and a brake having a 98% health status. The health status or value may indicate a remaining lifetime of the component. The fleet database 140 may also store the driver style classification 118 for the first vehicle 114 as, e.g., slow and smooth. The driver style classification 118 may be stored along with information on the vehicle's application, e.g., mining, refuse, transport of goods or passengers, etc., and along with information on a classification of the route indicating type of road(s), a level of difficulty and maneuverability, length, and other features of the route that may be traveled by the vehicle. Continuing with this example, the fleet database 140 may store the driver style classification 128 for the second vehicle as, e.g., rash driving. The driver style classification 128 may be stored along with information on the vehicle's application and a type of the route that may be traveled by the second vehicle. Other vehicles in the fleet may have various other applications and determined driving styles as, e.g., for a refuse collection vehicle, many braking events; and for a concrete pumper, rash driving by swerving often.

The simulation module or simulator 108 may acquire data from the fleet database 140 and may process the data using, e.g., the first vehicle dynamics model 104 and the second vehicle dynamics model 105, as well as similar dynamics models generated for each of the vehicles modeled as part of the fleet. The first vehicle dynamics model 104 and the second vehicle dynamics model 105, which may be included in the simulation module 108, may each be configured to simulate performance of subsystems of the respective vehicle. A vehicle simulator, simulating physics and dynamics of the vehicle, may thus be employed. Each of the first vehicle dynamics model 104 and the second vehicle dynamics model 105 may include more than one simulator, e.g, separate simulators may be used for different subsystems of the vehicles, or parts of a subsystem.

The first vehicle dynamics model 104 and the second vehicle dynamics model 105 may be machine-learning models that are configured to estimate values of vehicle operating cost parameters by modeling cases when one or more of the components of the modeled vehicle in the fleet are replaced by corresponding components from one or more of other vehicles in the fleet. Thus, the first vehicle dynamics model 104 may estimate the value of the at least one first vehicle operating cost parameter value by considering that a first component from a plurality of components of the first vehicle is replaced with a corresponding second component of the second vehicle, and the second vehicle dynamics model 105 may estimate the value of the at least one second vehicle operating cost parameter value by considering that the second component from a plurality of components of the second vehicle is replaced with the corresponding first component of the first vehicle.

It should be noted that component(s) exchange between the first and second vehicles 114, 115 is described for illustration purposes only, as each vehicle in the fleet may have one or more of its components replaced with component(s) from another vehicle in the fleet. In other words, the embodiments are not limited to component swapping between two vehicle, as, for example, vehicle A may have a component x replaced with a component y from vehicle B, while vehicle B may have its component y replaced with a component z from vehicle C. Also, a component in a vehicle may be replaced with a component that is currently not part of a vehicle, e.g., a component from a warehouse or another location. Any combinations of components replacement among the vehicles in the fleet may be modeled in the computations performed by the vehicle dynamics models.

Figure 3:
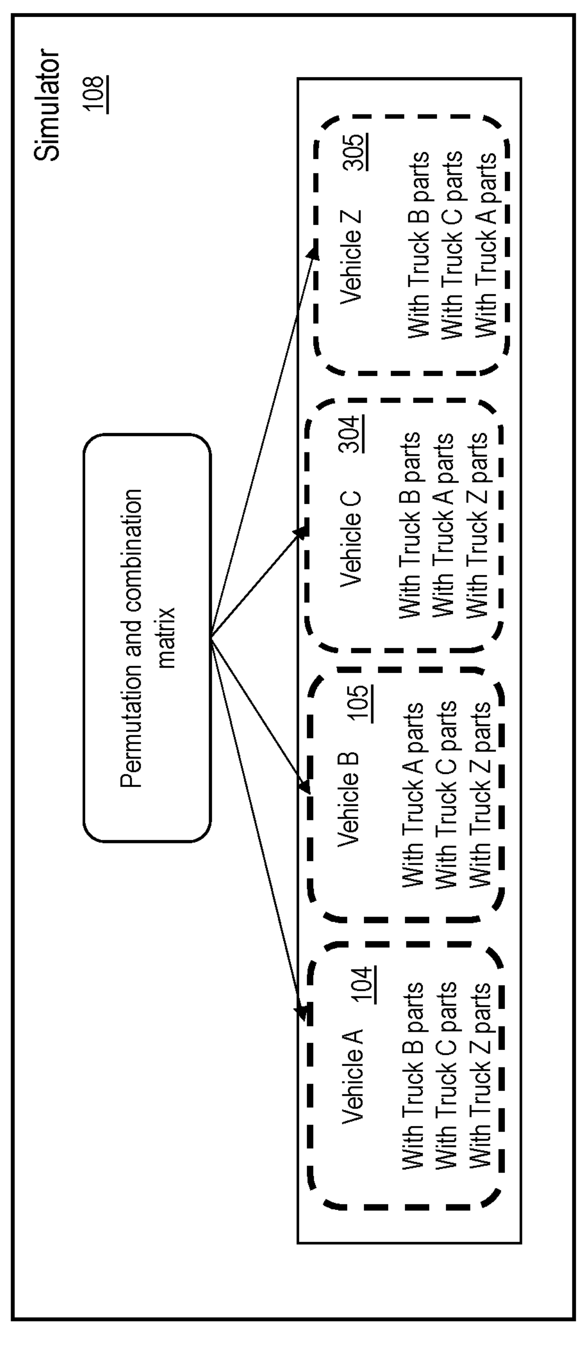
FIG. 3 is a block diagram illustrating an example of a simulator of the fleet management system of FIG. 1B.

Thus, in some embodiments, as shown in FIG. 3, the vehicle dynamics models may each model a respective vehicle and/or a dynamics of the vehicle operation, with that vehicle's components or parts replaced by parts from other vehicles. For example, as shown in FIG. 3, the first vehicle dynamics model 104 of the first vehicle A may model the first vehicle with parts from vehicles (trucks, in this example) B, C, and Z. Similarly, the second vehicle dynamics model 105 of the second vehicle B may model the second vehicle with parts from trucks A, C, and Z. FIG. 3 additionally illustrates a third vehicle model 304 of a third vehicle C that models the third vehicle C with parts from trucks B, A, and Z; and a fourth vehicle model 305 of a fourth vehicle Z that models the fourth vehicle Z with parts from trucks B, C, and A. In this way, vehicle dynamics models may be generated for some or all of the vehicles in the fleet.

In some embodiments, a permutation and combination matrix may be created from the information in the vehicle models, as shown in FIG. 3. The matrix may be a size of N×M, where N is a number of vehicles (e.g., trucks) in the fleet, and M is a number of components or parts that are considered for replacement or substitute among the vehicles in the fleet. Each row may correspond to a vehicle with its part(s) replaced, as modeled by a vehicle dynamics model for that vehicle. The vehicle dynamics models may be similar for vehicles of a similar type, and similar inputs may be provided to the models, such as a health status of subsystem(s) and parts thereof of the vehicle, as well as one or more of an application, route, and a driver style of the vehicle's driver.

An input to a vehicle dynamics models may comprise, for each of the subsystems of the vehicle and/or a subsystem part, parameters which each may be associated with respective health statuses. Values of the parameters may be numerical values. In addition or alternatively, the values may belong to categories, e.g., to two or more categories. For example, for the brakes subsystem, a brake pedal may be associated with a stiffness and orifice, and the health status of the brake pedal may be one of "good," "worn out," and "broken." Similarly, an electronic valve, chamber brake, and a caliper of the brakes subsystem may be associated with one of "good," "worn out," and "broken" statuses. A rotor may be associated with one of "good," "cracked," and "broken" statuses. For the steering subsystem, a tie rod or track rod may have a wheel angles parameter and a health status selected from "good," "poor compliance," and "broken". As an example, a component may be associated with a "broken" category when it has about 25% or less of its lifetime left (in other words, its health status is about 25% or less), with a "worn out" category when it has between about 20% and about 80% of its lifetime left, and with a "good" category when it has between about 80% and about 100% of its lifetime left. The above values are shown as an example only, as other values may be used to define categories of health statuses of components. Also, any suitable number of categories may be defined, depending on a type of the component, its use, and other factors.

The input type may vary among different models simulating different types of vehicles. The vehicle dynamics model for the vehicle may predict which components of the vehicle may be replaced with certain specific components from other vehicle(s), to result in certain values of one or more vehicle operating cost parameters.

Results of the processing in the simulator 108 may be provided to a simulation results module or database 112. The simulation results database 112 may be part of the simulator 108 and is shown separately for illustration purposes only.

The processing in the simulator 108 uses the subsystem's health status and driver style classification for each vehicle modeled as a respective vehicle dynamics model, and the simulator 108 estimates or determines values of vehicle operating cost parameters for each replacement combination of one or more components of the vehicle with one or more components of other vehicle(s) in the fleet. For example, continuing with the example above, fuel economy and components wear may be estimated for vehicle A with parts from each of vehicles B, C, and Z. Similarly, fuel economy and components wear may be estimated for vehicle B with parts from each of vehicles A, C, and Z. In addition, in some cases, fuel economy and components wear may be estimated for a vehicle with part(s) from one or more of other vehicles, and/or part(s) that are not installed on a vehicle such as e.g. a part from a manufacturer, warehouse, or another source. In other words, a vehicle dynamics model may model a scenario when a vehicle in the fleet may have its component replaced with a component that is not taken from another vehicle, but a new or used component from a source other than another vehicle in the fleet.

Referring back to the example of FIG. 1B, values of fuel economy, components wear, and other operating cost parameters, collectively denoted herein as operating cost parameter value(s) 124 for Vehicle A running with parts of Vehicle B or first vehicle operating cost parameter value(s) 124, may be determined for the first vehicle A 114 when one or more parts of that vehicle A are replaced with one or more parts from the vehicle B 115. Similarly, values of fuel economy, components wear, and other operating cost parameters, collectively denoted herein as operating cost parameter value(s) 125 for the vehicle B running with parts of Vehicle A or second vehicle operating cost parameter value(s) 125, may be determined for the second vehicle B 115 when one or more parts of the vehicle B are replaced with one or more parts from Vehicle A. Values of operating cost parameters may be determined in a similar manner for each vehicle in the fleet for which a model is created and which operation is controlled as part of the fleet management.

The fleet dynamics controller 102, e.g., the simulator 108 and/or a reinforcement learning (RL) module or model 142, are further configured to process the first vehicle operating cost parameter value and the second vehicle operating cost parameter value to estimate at least one fleet operating cost parameter value related to operation of the fleet of vehicles. In some implementations, as shown in FIG. 1B, the simulator 108, the simulating results storage 112, and the RL model 142 may be part of a same component 150. The first vehicle operating cost parameter value(s) 124 and the second vehicle operating cost parameter value(s) 125 may be processed, using the RL model 142, to estimate the at least one fleet operating cost parameter value related to operation of the fleet of vehicles. For example, once operating cost parameter values for all the combinations of parts replacements are computed, the fleet operating cost parameter value may be estimated. The value of the fleet operating cost parameter may be estimated, for each combination of components replacement or redistribution, based on values of vehicle operating cost parameters estimated for the vehicles in the fleet.

Further, the simulator 108 and/or the RL module or model 142 determine a recommended component redistribution of the first vehicle to the second vehicle to improve or optimize the at least one estimated fleet operating cost parameter value. For example, a combination that results in the greatest improvement of the value of the fleet operating cost parameter may be used to determine the recommended component redistribution. More than one recommended component redistribution may be determined.

The recommended component redistribution may be provided to the fleet management controller 110 that may instruct implementations of the recommended component redistribution in actual vehicles in the fleet or, in some cases, in a simulator. The recommended component redistribution may be implemented in the actual vehicles in the fleet.

The system 100 may then acquire subsequent first sensor data 120 from the plurality of first sensors of the first vehicle with a first redistributed component of the component redistribution, and subsequent second sensor data 130 from the plurality of second sensors of the second vehicle with a second redistributed component of the component redistribution. It is noted that, although the subsequent first sensor data 120 and the subsequent second sensor data 130 are denoted in FIG. 1 using the same numerical references as the first sensor data 120 and the second sensor data 130, respectively, the subsequent sensor data may be acquired after the recommended component redistribution is implemented in the actual vehicles in the fleet. Furthermore, the sensor data may be acquired as the vehicle operates.

In some embodiments, the recommended component redistribution may be implemented in a simulator, such that subsequent first and second sensor data may be virtual sensor data that is generated by the simulator.

The subsequent sensor data and the second sensor data may be provided to a feedback module 144 that may generate an indication indicating whether or not the recommended component redistribution optimized the at least one estimated fleet operating cost parameter value. The feedback module 144 may thus provide a reward or punishment feedback to the RL model 142. The RL model 142 may employ a model-based RL agent (a machine-learning model) that is trained to compute what action to take based on previous experiences of reward or punishment regarding the action. The RL agent may be said to maximize a numerical reward for solving a particular problem.

The feedback module 144 may provide a "reward" or a positive feedback to the RL model 142 when the recommended component redistribution optimized the at least one estimated fleet operating cost parameter value. And the feedback module 144 may provide a "punishment" or a negative feedback to the RL model 142 when the recommended component redistribution did not optimize the at least one estimated fleet operating cost parameter value.

In some embodiments, if the indication indicates that the recommended component redistribution did not optimize the at least one estimated fleet operating cost parameter value (i.e., there is a negative feedback from the feedback module 144), the subsequent recommended component redistribution may be determined using an alternative recommended component redistribution. Information on the alternative recommended component redistribution, similar to the (prior) recommended component redistribution, may be provided to a fleet owner, a driver of the vehicle, and/or to any other entity.

In embodiments herein, subsequent first sensor data and the subsequent second sensor data may be acquired repeatedly from the plurality of first sensors of the first vehicle and the plurality of second sensors of the second vehicle, respectively. The sensor data may be used to iteratively update a recommended component redistribution to generate one or more subsequent component redistributions. Thus, as further data, such as (subsequent) sensor data, is collected from the vehicles in the fleet, the feedback module 144 and RL model 142 may be used to repeatedly update the component redistribution.

Figure 2A:
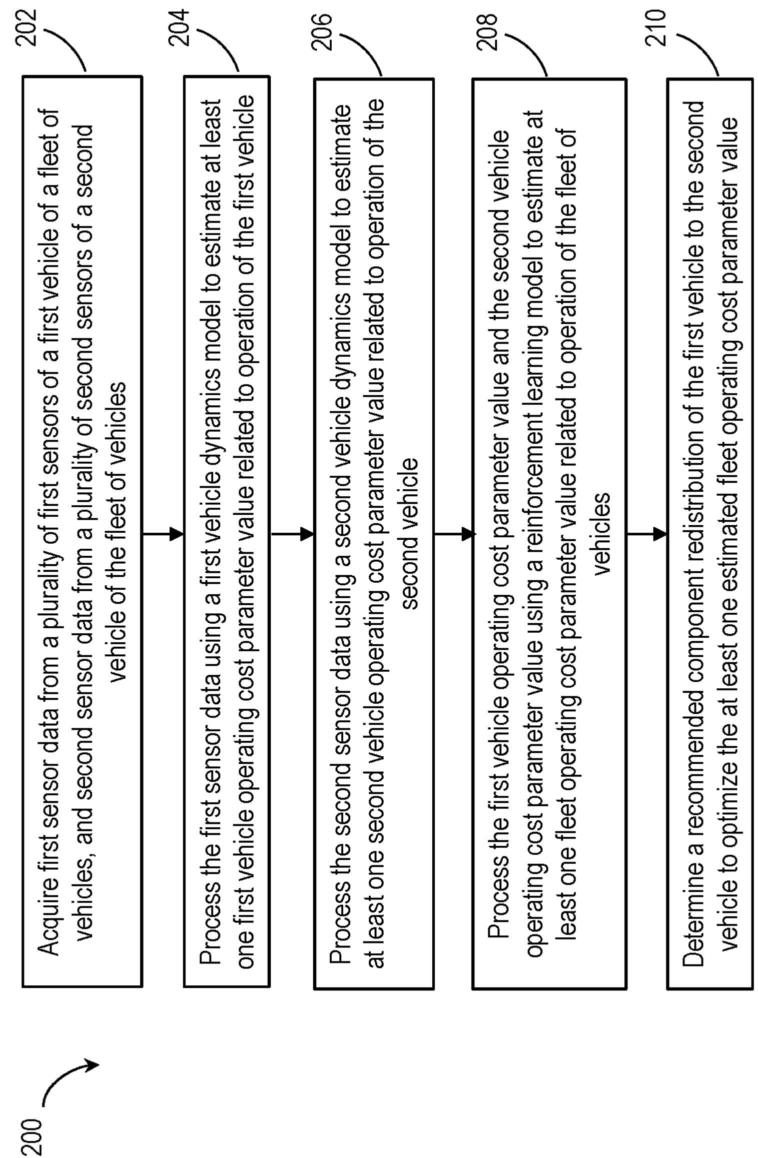
FIGS. 2A and 2B are flowcharts illustrating a method of controlling operation of a fleet of vehicles, according to an example.
Figure 2B:
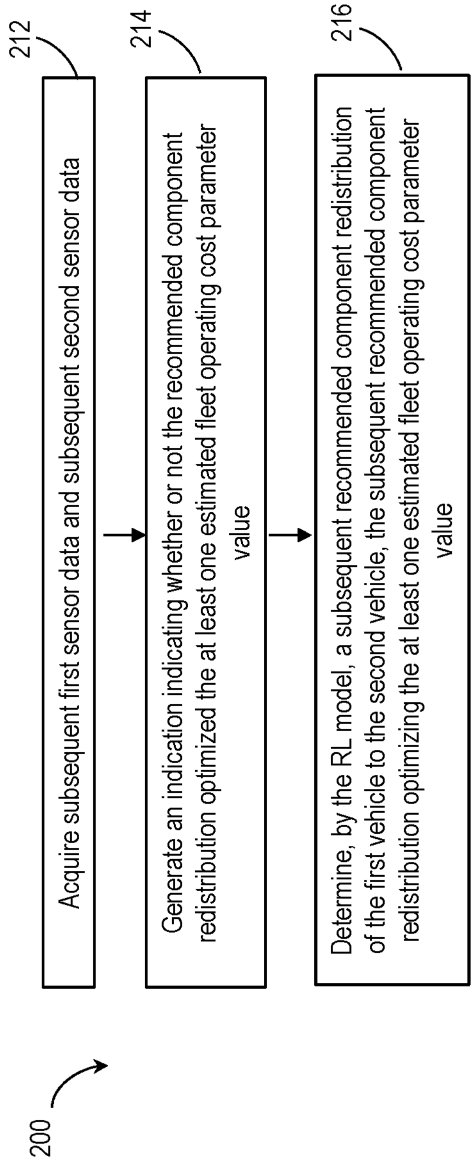

FIGS. 2A and 2B illustrate a method 200 of controlling operation of a fleet of vehicles in accordance with aspects of the present disclosure. The fleet may be, e.g, fleet 30 of FIG. 1A comprising a plurality of vehicles. The method 200 may be performed in a fleet management system such as, e.g., fleet management system 10 (FIG. 1A) or 100 (FIG. 1B), by a controller such as, e.g., fleet dynamics controller 102 of FIG. 1B. Some details of the method as described here are also discussed above in connection with FIGS. 1A and 1B.

As shown in FIG. 2A, the method comprises, at block 202, acquiring first sensor data from a plurality of first sensors of a first vehicle of a fleet of vehicles, and second sensor data from a plurality of second sensors of a second vehicle of the fleet of vehicles. The first vehicle comprises a plurality of first components and the second vehicle comprises a plurality of second components. The plurality of first components of the first vehicle may comprise one or more components of tires, a steering wheel system, a brakes system, a transmission system, a suspension system, an aerodynamics system, and a powertrain system. Similarly, the plurality of second components of the second vehicle may comprise one or more components of tires, a steering wheel system, a brake system, a transmission system, a suspension system, an aerodynamics system, and a powertrain system. For example, the brakes system or subsystem may comprise a brake pedal, electronic valve, chamber brake, caliper, friction pad, and a rotor; the transmission system or subsystem may comprise a throttle, engine, clutch, torque converter, automated manual transmission, propeller shaft, differential, and drive shaft; the suspension system or subsystem may comprise a leaf spring or airbag, shock absorber (damper), control arms, wheel kinematics (jounce and rebound), torsion bar, and electronically controlled suspension valves; and the steering system or subsystem may comprise a tie rod or track rod, steering compliance bushings, steering gear, steering column, dynamic steering (DS) controller, and DS motor. These examples are non-limiting.

Sensor data may be acquired from components of the system or from the system(s) of each of the vehicles in the fleet. The (sub)systems of the vehicle, such as tires, steering wheel, brakes, transmission, aerodynamics, powertrain and other subsystems are parts of a chassis system of the vehicle.

It should be appreciated that, although the method 200 is described in connection with the first and second vehicles, the fleet of vehicles may comprise multiple vehicles, and that the aspects of the present disclosure are applicable to other vehicles in the fleet.

As an example, with reference to FIG. 1B, the first sensor data 120 and the second sensor data 130 may be acquired from respective first and second sensors, which may be various multiple sensors, of the first and second vehicles. The sensors may measure values of various parameters related to performance of components of subsystem's of the first and second vehicles. The sensor data may also include driver input received via various input and/or control devices.

The first sensor data and the second sensor data may be stored in a cloud fleet database which may be any suitable cloud data storage in a cloud.

At block 204, the first sensor data may be processed using a first vehicle dynamics model to estimate at least one first vehicle operating cost parameter value related to operation of the first vehicle. The first vehicle dynamics model may estimate the value of the at least one first vehicle operating cost parameter value by considering that a first component from the plurality of first components of the first vehicle is replaced with a corresponding second component of the second vehicle.

At block 206, the second sensor data may be processed using a second vehicle dynamics model to estimate at least one second vehicle operating cost parameter value related to operation of the second vehicle. The second vehicle dynamics model may estimate the value of the at least one second vehicle operating cost parameter value by considering that the second component from the plurality of second components of the second vehicle is replaced with the corresponding first component of the first vehicle.

The first vehicle dynamics model and the second vehicle dynamics model may be included in a simulator or the models may be implemented by the simulator, e.g., simulator 108 of FIG. 1B. More than one simulation system may be used to simulate operation of the first and second vehicles, as well as other vehicles in the fleet.

In some embodiments, the first sensor data comprises driver input or driver input signals of the first vehicle, and the second sensor data comprises driver input or driver input signals of the second vehicle. The driver input signals may comprise signals, e.g., sensor data and/or data acquired by control units of the vehicle in response to input received from the driver as the driver is operating the vehicle. In some embodiments, the driver input signals may be historical data acquired based on inputs received from the driver, with respect to various systems, actuators and/or controls for vehicle operation. The historical data may be acquired during certain prior period(s) of time, as the vehicle was operated by the driver in the past.

In some embodiments, the first sensor data may be processed to generate a health status of at least one subsystem of the first vehicle, and the second sensor data may be processed to generate a health status of at least one subsystem of the second vehicle. The health status of at least one subsystem of the first vehicle and the health status of at least one subsystem of the second vehicle may be generated as described, e.g., in connection with FIG. 4, below. The health status may indicate a condition of a corresponding subsystem or a component (or part) of the subsystem of the vehicle.

In some embodiments, the first sensor data may be processed to determine one or more of an application of the first vehicle, a route for the first vehicle, and a driver style classification of a driving style of a driver of the first vehicle. In some embodiments, the second sensor data may be processed to determine one or more of an application of the second vehicle, a route for the second vehicle, and a driver style classification of a driving style of a driver of the second vehicle. The application, route, and the driver style for each of the vehicles in the fleet may be determined as described, e.g., in connection with FIG. 5, below.

In some embodiments, the first vehicle dynamics model may use one or more of the application of the first vehicle, the route for the first vehicle, the driver style classification of the driving style of the driver of the first vehicle, and the health status of the at least one subsystem of the first vehicle to estimate the at least one first vehicle operating cost parameter value. Similarly, the second vehicle dynamics model may use one or more of the application of the second vehicle, the route for the second vehicle, the driver style classification of the driving style of the driver of the second vehicle, and the health status of the at least one subsystem of the second vehicle to estimate the at least one second vehicle operating cost parameter value.

At block 208, the first vehicle operating cost parameter value and the second vehicle operating cost parameter value may be processed using a reinforcement learning module to estimate at least one fleet operating cost parameter value related to operation of the fleet of vehicles. Respective values of one or more first vehicle operating cost parameters and one or more second vehicle operating cost parameters may be used to determine or estimate a value of the at least one fleet operating cost parameter. For example, the values of the operating cost parameters estimated for two or more vehicles may be weighted to determine a value of the fleet operating cost parameter.

The reinforcement learning module, such as, e.g., RL model 142 of FIG. 1B, may be configured to estimate and update, based on subsequent sensor data, a value of the at least one fleet operating cost parameter. The RL model may be refined based on a feedback.

The at least one fleet operating cost parameter value may comprise a value of one or more of fuel economy in the fleet of vehicles, operational efficiency of the fleet of vehicles, downtime of one or more vehicles in the fleet of vehicles, ride comfort of one or more vehicles in the fleet of vehicles, and a component wear of one or more vehicles in the fleet of vehicles.

At block 210, a recommended component redistribution of the first vehicle to the second vehicle may be generated or determined, to optimize the at least one estimated fleet operating cost parameter value.

The recommended component redistribution may be the recommended component redistribution of the first vehicle to the second vehicle, such that at least one component of a subsystem of the first vehicle may be redistributed, e.g., moved, to the second vehicle. A corresponding component of the second vehicle may be installed to the first vehicle, to replace the components redistributed from the first vehicle. Also, the component being redistributed from the first vehicle to the second may be replaced, in the second vehicle, with a component from any one vehicle in the fleet. In other words, as discussed above, the recommended component redistribution may include, for each vehicle, information on redistribution of at least one component of this vehicle to any other vehicle in the fleet.

In some embodiments, a combination that results in the greatest improvement of the value of the fleet operating cost parameter may be used to determine the recommended component redistribution. More than one recommended component redistribution may be determined, and the multiple component redistributions may be ranked based on values of a fleet operating cost parameter that are expected to be achieved with a certain component redistribution. A component redistribution with the rank corresponding to the greatest value of a fleet operating cost parameter may be selected as a recommended component redistribution. More than one fleet operating cost parameters may be used, and the recommended component redistribution may be the one that is expected to result in the greatest values for all of the fleet operating cost parameters used, or for some of the parameters. Furthermore, as mentioned above, fleet operating cost parameters may be weighed depending on a type of the fleet and tasks or missions performed by the vehicles in the fleet. In addition, the recommended component redistribution may take into account a current distance between two or more vehicles for which component redistribution is recommended, since the distance may affect time and efficiency of bringing the two or more vehicle together, e.g., to the same location, to implement the redistribution in these vehicles. Also, replacing a component with another component may be associated with certain costs, and the method in accordance with aspects of the present disclosure may take these costs into consideration while generating the recommended component redistribution.

The recommended component redistribution may include information on, e.g., a first redistributed component included or redistributed (instead of an original component or a current component) to the first vehicle, and a second redistributed component included or redistributed (instead of an original component or a current component) to the second vehicle. It should be noted that a vehicle whose dynamics is modeled in accordance with embodiments of the present disclosure may not necessarily have all of its components as originally provided by a manufacturer, such that one or more of vehicle's current components may already be replacement components, e.g. previously taken from other vehicle(s) in the fleet.

At block 211, the recommended component redistribution may be sent to at least the first vehicle and the second vehicle, and/or to any other suitable recipient. The recommended component redistribution may be provided to a fleet operator or owner, to drivers of the first and second vehicles, to a mechanics workshop that would implement the physical change in the vehicles, and/or to any other entity that may be involved in managing and operating the fleet.

In some examples, sending the recommended component redistribution may comprise providing the recommended component redistribution from the reinforcement learning model to a fleet management controller that generates a signal instructing implementation of the recommended component redistribution of the first vehicle to the second vehicle. The fleet management controller, e.g., fleet management controller 110 of FIG. 1B, may be operated by a user such as e.g. a fleet owner or another user, and commands, signals, and/or instructions may be sent to vehicles, drivers, and/or other entities (e.g., a mechanics team) regarding implementing a recommended component redistribution, which may be an initially determined recommended component redistribution or a subsequent recommended component redistribution.

As shown in FIG. 2B, the method 200 further comprises, at block 212, acquiring subsequent first sensor data from the plurality of first sensors of the first vehicle with a first redistributed component of the component redistribution, and subsequent second sensor data from the plurality of second sensors of the second vehicle with a second redistributed component of the component redistribution. In some embodiments, the subsequent first sensor data and the subsequent second sensor data may be stored in the cloud fleet database.

The subsequent first sensor data, e.g., subsequent first sensor data 120 of FIG. 1B, may be acquired from the plurality of first sensors of the first vehicle with a first redistributed component of the component redistribution. The subsequent second sensor data, e.g., subsequent second sensor data 130 of FIG. 1B, may be acquired from the plurality of second sensors of the second vehicle with a second redistributed component of the component redistribution. In other words, the subsequent first and second sensor data may be collected from the respective vehicles after the recommended component redistribution is implemented in the actual vehicles, such as a physical change is made in the vehicles. For example, a clutch in the first vehicle may be replaced with a clutch from the second vehicle, and vice versa, and sensor data may be collected as the first and second vehicle operate with the replaced clutches. It should be noted, however, that, as mentioned above, component redistribution may include information on exchange other than reciprocal.

At block 214, an indication may be generated indicating whether or not the recommended component redistribution optimized the at least one estimated fleet operating cost parameter value. The indication may be generated by a feedback module, e.g., feedback module 144 of FIG. 1B that provides the indication to the reinforcement learning model such as e.g., the RL model 142 of FIG. 1B. For example, the feedback module 144 may thus provide a reward or punishment feedback to the RL model 142.

With reference to FIG. 1B, the feedback module 144 may provide a "reward" or a positive feedback to the RL model 142 when the recommended component redistribution optimized the at least one estimated fleet operating cost parameter value. The feedback module 144 may provide a "punishment" or a negative feedback to the RL model 142 when the recommended component redistribution did not optimize the at least one estimated fleet operating cost parameter value. Thus, the reinforcement learning model may get credit if the economy of the fleet is increased. The reinforcement learning model may be "punished" if the economy of the fleet is decreased, in which case change to one or more vehicles in the fleet, in accordance with the recommended component redistribution, are not made further. In this way, if a certain redistribution is shown, in practice, not to improve a fleet operating cost parameter value, this change may not be part of a further recommended component redistribution. The RL model 142 may be updated based on the received feedback.

As used herein, the optimization of the at least one estimated fleet operating cost parameter value means an improvement, such as an increase or decrease in the value of a fleet operating cost parameter e.g. as determined at block 208 herein, depending on a type of the fleet operating cost parameter. For example, for a fuel economy parameter for the fleet, the optimization of its value may mean a decrease in the value if the fuel economy is expressed as a number of liters spent for a certain distance, e.g., 100 km (L/100 km). If the fuel economy is expressed as a distance traveled using a specific amount of fuel, then an increase in this value will be taken as an optimization of the fuel economy. For an operational efficiency of the fleet of vehicles, an increase in its value may be considered as an optimization or improvement. For fleet vehicles downtime and component wear, a decrease in their values may be taken as an optimization or improvement of the fleet.

In some embodiments, in addition or alternatively, a target value of the fleet operating cost parameter may be used, and it may be determined, e.g. using the feedback module 144, whether the recommended component redistribution, as implemented in the physical world or virtually, resulted in a value of the fleet operating cost parameter that is closer to or further away from the target value. If the recommended component redistribution resulted in a value of the fleet operating cost parameter that is closer to the target value of that fleet operating cost parameter, the recommended component redistribution may be considered as optimizing the fleet operating cost parameter. If the recommended component redistribution resulted in a value of the fleet operating cost parameter that is further away from the target value of that fleet operating cost parameter, the recommended component redistribution may be considered to not optimize the fleet operating cost parameter.

At block 216, the method 200 may include determining, by the reinforcement learning model, a subsequent recommended component redistribution of the first vehicle to the second vehicle, the subsequent recommended component redistribution optimizing the at least one estimated fleet operating cost parameter value. In certain examples, if the indication indicates that the recommended component redistribution optimized the at least one estimated fleet operating cost parameter value, the subsequent recommended component redistribution may be determined using the recommended component redistribution. In certain examples, if the indication indicates that the recommended component redistribution did not optimize the at least one estimated fleet operating cost parameter value, the subsequent recommended component redistribution may be determined using an alternative recommended component redistribution.

In some embodiments, if the indication indicates that the recommended component redistribution, when implemented in actual vehicles or in a simulator, did not optimize the at least one estimated fleet operating cost parameter value (i.e., there is a negative feedback from the feedback module 144), the subsequent recommended component redistribution may be determined using an alternative recommended component redistribution. In other words, an alternative recommended component redistribution may be taken as the subsequent recommended component redistribution if the previous recommended component redistribution did not show to improve values of one or more of the fleet operating cost parameters. The alternative recommended component redistribution may be a next best recommended component redistribution, e.g., a component redistribution that was previously estimated to also optimize, but to a lesser degree, the fleet operating cost parameter value, and that was not (yet) implemented in actual vehicles or in a simulator.

In embodiments herein, subsequent first sensor data and the subsequent second sensor data may be acquired repeatedly from the plurality of first sensors of the first vehicle and the plurality of second sensors of the second vehicle, respectively. The sensor data may be used to iteratively update a recommended component redistribution to generate one or more subsequent component redistributions. Thus, as further sensor data is collected from the vehicles in the fleet, the feedback module 144 and RL model 142 may be used to repeatedly update the component redistribution. The vehicle dynamics models 104, 105 may be updated as well.

Furthermore, in some embodiments, in addition to or alternatively to generating a recommended component redistribution that indicates a physical modification to vehicles in the fleet, a recommended change to one or more parameters of the vehicles in the fleet may be generated. For example, a recommended parameter change may be generated for one or more vehicles in the fleet, e.g., the first and second vehicles discussed by way of example herein. The recommended parameter change may be, e.g., modification of one or more proportional-integral-derivative (PID) controller parameters. Furthermore, an instruction may be sent to a driver of a vehicle, e.g., to adjust operation of the vehicle. The instruction may be sent, e.g, to an on-board controller of the vehicle, in the form of visual, audio, and/or any other signals. The instruction may also be sent via a smartphone or another mobile device used by the driver, e.g., via an app. Additionally, a message may be sent to a fleet owner.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Figure 4:
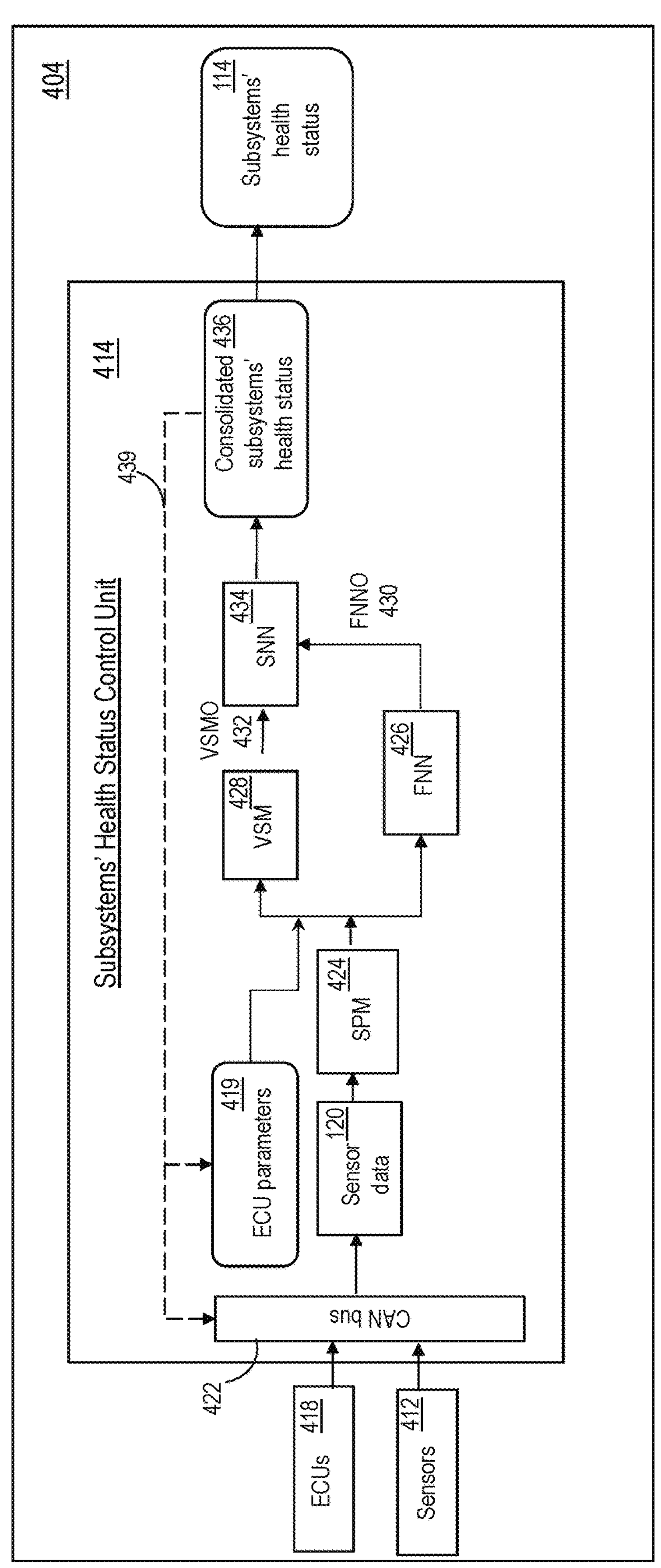
FIG. 4 is a block diagram illustrating a subsystems' health status control unit, according to an example.
Figure 5:
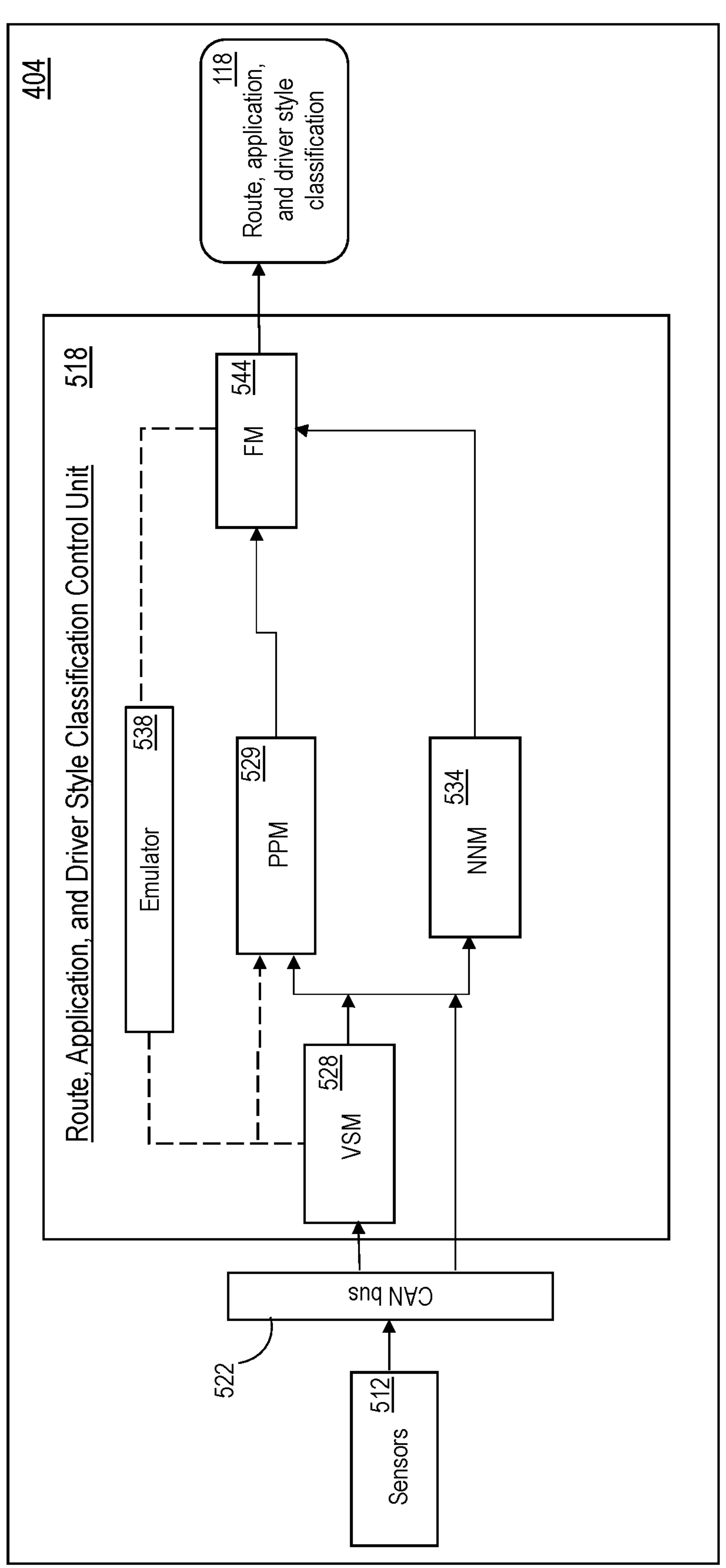
FIG. 5 is a block diagram illustrating route, application, and driver style classification control unit, according to an example.

FIGS. 4 and 5 illustrate examples of control units that may be used to generate a health status of subsystems, or subsystems' health status, of a vehicle in a fleet of vehicles, and application and driver style classification which comprise an application of the vehicle and a driving or driver style of the vehicle. FIGS. 4 and 5 illustrate a vehicle such as the first vehicle A discussed in connection with FIG. 1B, but it should be appreciated that the control units of FIGS. 4 and 5 may be implemented for controlling any of the vehicles in the fleet. It should also be appreciated that the specific implementations of the control units of FIGS. 4 and 5 are shown as an example only, as information on the health status of vehicle's subsystems, and information on the vehicle's application and driver style classification may be generated in other suitable ways, including using control units having other configurations.

FIG. 4 illustrates an example of a vehicle 404 in a fleet of vehicles, the vehicle 404 comprising a subsystems' health status control unit 414 that is configured to provide a vehicle's subsystems' health status. The vehicle 404 may be, for example, the first vehicle A discussed in connection with FIG. 1B (referred to herein as a vehicle), and it may be configured to provide subsystems' health status 114 as also shown in FIG. 1B. The subsystems' health status control unit 414 of the first vehicle A 404 is shown by way of example, and similar control units may be used for other vehicles in the fleet, such as the second vehicle B, or any other vehicle.

As shown in FIG. 4, the subsystems' health status control unit 414 may receive input from a plurality of sensors 412 and from at least one electronic control unit (ECU) 418 of the vehicle 404. The plurality of sensors 412 may comprise all or some sensors of a chassis system of the vehicle 404. In some embodiments, plurality of sensors 412 may comprise one or more of a brake pedal position sensor, a throttle pedal position sensor, a steering angle sensor, a wheel speed sensor, a wheel alignment sensor, a vehicle speed sensor, a vehicle accelerometer, a temperature sensor, a pressure sensor, and any other sensor(s).

The plurality of sensors 412 may comprise sensors of a throttle and clutch system, such as, e.g., the throttle pedal position sensor, a throttle input sensor, a demand torque sensor, an actual torque sensor, a transmission torque sensor, a clutch state sensor, a differential state sensor, a wheel speed sensor, a shaft speed sensor, etc. The plurality of sensors 412 may also comprise sensors associated with a steering input system, such as a steering angle sensor, a dynamic steering torque sensor, a wheel angle sensor, a dynamic steering input torque sensor, a ride height sensor, a pitch angle sensor, a roll angle sensor, a wheel travel sensor, a rollrate sensor, front load sensor, a rear load sensor, an inclination sensor, etc.

The sensors 412 are configured to measure data such as physical data which can be measured at any part of any subsystem of the chassis system of the vehicle 404. Non-limiting examples of sensor data comprise a wheel speed, a wheel alignment, a vehicle speed, a temperature, a pressure, a vehicle acceleration, an steering angle, a throttle pedal position, and a brake pedal position.

The ECU(s) 418 may be microprocessors installed on the chassis system and on subsystems of the chassis system of the vehicle 404. For example, multiple ECUs may be installed or associated with particular subsystems of the chassis system of the vehicle 404, to control the subsystems, based on parameters, including ECU parameters 419. The ECU parameters 419 may be configurable parameters which may be entered into a physics-based vehicle chassis system simulation module (VSM) 428. The ECU parameters 419 may be, e.g., variables embedded in the code and configurable using an external system for tuning the control system. The ECU parameters may include, e.g., a final drive line gear ratio or tire radius, which may be updated automatically, either through ECUs 418 or manually, e.g., during servicing of the vehicle. The final drive line gear ratio may be updated when the gear is replaced with a new, different gear ratio.

The vehicle 404 further comprises a communication bus configured to electronically convey data shared between ECUs 418. The communication bus may be, e.g., a controller area network (CAN) bus 422, which is a secure communication protocol for communication among various electronic control units in vehicles. Each of the ECUs 418 may be connected to one or more sensors from the plurality of sensors 412. The sensors 412 and the ECUs 418 may also communicate with each other and with other components of the vehicle using ethernet cables, Wi-Fi, Bluetooth, and other network interfaces.

Data acquired from the sensors 412 and the ECUs 418 may be collectively referred to as a (first) sensor data 120, also shown schematically in FIG. 1B. The sensor data 120 may comprise measured signal data such as, e.g., speed, a temperature, a pressure, a throttle, etc.

Data acquired from the ECUs 418 may comprise values of multiple parameters such as, e.g., proportional-integral-derivative (PID) controller gains, brake factor, tire radius, etc. In some embodiments, the parameters may comprise at least one high frequency changing parameter, e.g., a parameter having a value that changes with a frequency of less than one second, or within less than 25 meters of vehicle travelling. In some embodiments, at least for training machine-learning models used herein, values of parameters may be acquired as time series data with the frequency of from about every 1 minute to about every 5 minutes of driving. In some embodiments, values of parameters may be acquired as time series data as the vehicle travels a certain distance, e.g., every 1 mile (speed above 45 mph) or every 0.5 miles for speed less than 45 mph. Furthermore, in some embodiments, values of parameters may be acquired with a lesser frequency, to determine whether a change in components redistribution is required. In some cases, the sensor data may be acquired as the vehicle travels a new route, or in response to other various trigger events.

In some embodiments, the ECUs 418 may be used to acquire values of parameters comprising parameters related to components of a brake system, the components comprising a brake pedal, with related parameters such as stiffness and orifice; and/or an electronic valve of the brake system, with related parameters such as a solenoid spring stiffness, PID gains, valve piston friction and mass; and/or a chamber brake with related parameters such as a pad wear or thickness, a chamber spring stiffness; and/or a caliper with related parameters such as a pivot arm, a gear mesh and friction; and/or a friction pad, with related parameters such as a friction coefficient; and/or a rotor with related parameters such as temperature and effective radius.

The sensor data 120 related to tires may comprise a vehicle velocity, tire pressure(s), road surface type over which the vehicle is currently traversing or is predicted to be traversing, a normal load for the vehicle, current steering input, and Inertial Movement Unit (IMU) at the Center of Gravity (CG) for the vehicle. Other exemplary data which may be collected may include slip data for the various wheels, braking capacity, angle of ascent/descent, general engine data, road conditions (wet, dry, icy, etc.), and/or any other data conveyed via the CAN bus within the vehicle.

In some embodiments, the ECUs 418 may be used to acquire values of parameters comprising parameters related to any components of the transmission system, the components comprising for example the throttle with related parameters such as a stiffness, the components comprising for example the engine with related parameters such as an engine map, an engine efficiency, a friction, and PID gains, the components comprising for example the clutch with related parameters such as a friction coefficient, the components comprising for example the torque converter with related parameters such as an efficiency and angles, the components comprising for example the gear with related parameters such as an efficiency, and gear ratios, with PID gains, the components comprising for example a propeller shaft with related parameters such as an inertia, the components comprising for example the differential with related parameters such as an inertia and friction values with gear ratios, the components comprising for example the drive shaft with related parameters such as an inertia.

In some embodiments, the ECUs 418 may be used to acquire values of parameters comprising parameters related to any components of a suspension system, the components comprising for example a leaf spring or an airbag with related parameters such as a stiffness, the components comprising for example a shock absorber or a damper with related parameters such as a damping, the components comprising for example the control arms flexibility with related parameters such as a stiffness, the components comprising for example the wheel kinematics (jounce and rebound) with related parameters such as kinematic links, the components comprising for example a torsion bar with related parameters such as friction, the components comprising for example electronically controlled suspension valves with related parameters such as solenoid spring stiffness, PID gains, valve piston friction and mass.

In some embodiments, the ECUs 418 may be used to acquire values of parameters comprising parameters related to any component of a steering system, the components comprising for example tie rod or track rod, a steering compliance bushings, a steering gear, a steering column, a dynamic steering controller, a dynamic steering motor with related parameters such geometry and compliances.

The sensor data 120 may be fed to a signal processing module (SPM) 424 that processes the sensor data to generate a processed signal data. The processed signal data may be fed as input to a first neural network module (FNN) 426, trained for predicting a first neural network output (FNNO) that comprises a first set of data-driven subsystem health statuses 430. According to an embodiment, the sensor data 120, such as signal data, may be processed by removing noise from the signal data, and/or converting the signal data in a frequency domain, such as using a Fourier transformation of the signal data.

In some embodiments, the FNN 426 may be a recurrent neural network (RNN) that is configured to make predictions from signal data time series as input. Health status predicted by the RNN from the input may depend on the subsystem of the component considered. A subsystem's health status may be a numerical or textual value which may be selected from a set or group of values, e.g., "good", "worn out", "broken", "wear rate", "cracked", "acceptable", "unacceptable", "modification", etc. The RNN may be trained to generate predictions, based on sets of data time series processed and input to the RNN, and labelled according to an observed health status of a subsystem or a component considered.

As shown in FIG. 4, the processed signal data may also be fed as input to the VSM 428 that is configured to provide a vehicle chassis system simulation output (VSMO) that comprises a second set of physics-based subsystem health statuses 432. In some embodiments, the processed signal data may be provided to the FNN 426 and to the VSM 428 at the same time or during overlapping time periods. The VSM 428 may comprise a physics-based model of the entire vehicle 404, as well as physics-based model of subsystem of the chassis system of the vehicle 404 such as, e.g., a tires model, an engine and powertrain model, a valves model, a suspension and steering systems model, a brakes model, a vehicle geometry model, and a brake system model.

As further shown in FIG. 4, the first set of data-driven subsystem health statuses 430 and the second set of physics-based subsystem health statuses 432 are provided as input to a second neural network (SNN) 434 that may provide a second neural network output (SNNO) such as consolidated subsystems' health status 436 comprising health status values for each of the vehicle's subsystems or components of the subsystem(s). The SNN 434 may be similar to the FNN 426, e.g., it may be a RNN. As shown in FIG. 4 by a dashed line 439, the consolidated subsystems' health status 436 may be provided, via the CAN bus 422, to the ECUs 418, and may also be provided to update the ECU parameters 419.

The consolidated subsystems' health status 436 may be provided as a final subsystems' health status 114 (also shown in FIG. 1B), which may be used in accordance with embodiments herein for fleet operation optimization.

The subsystems' health status control unit 414 of FIG. 4 may be an electronics control unit that may be included in the vehicle 404. The control unit 414 may comprise memory and a processing circuit e.g. at least one processor configured to execute computer-executable instructions stored in the memory, to perform the processing to provide the subsystems' health status 114.

It should be appreciated that the subsystems' health status control unit 414 is shown in FIG. 4 as an example only, as the subsystems' health status 114 may be generated in any other suitable way, e.g., using one or more control units which may have a configuration different from that shown in FIG. 4. Furthermore, in some cases, a health status of one or more subsystems of the vehicle 404 may be determined using a control unit, simulator, and/or other component(s) that, at least in part, may not be included in the vehicle 404.

FIG. 5 illustrates another example of the vehicle 404 in a fleet of vehicles, and the vehicle 404 is shown in this example to include a route, application, and driver style classification control unit 518 that is configured to provide an application of the vehicle and a classification of a driver style of the driver of the vehicle 404. As in the example of FIG. 4, the vehicle 404 may be, for example, the first vehicle A discussed in connection with FIG. 1B (referred to herein as the vehicle). The route, application, driver style classification control unit 518 of the first vehicle A 404 is shown by way of example, and similar control units may be used for other vehicles in the fleet, such as the second vehicle B, or any other vehicle.

As shown in FIG. 5, the control unit 518 may receive input such as measured sensor data from a plurality of sensors 512 of the vehicle 404, which may be similar to sensors 412 (FIG. 4). The control unit 518 may also receive data from control units of the vehicle 404, such as control logic and/or a processors, which are not shown in FIG. 5. The control units may be e.g., ECUs 418 of FIG. 4.

As shown in FIG. 5, the control unit 518 comprises a vehicle simulation module (VSM) 528, a physics-based processing module (PPM) 529, a machine learning processing module such as a neural network module (NNM) 534, and a feedback module (FM) 544. Data measured by sensors 512 is conveyed by a communication bus, such as the CAN bus 522, to the control unit 518. The CAN bus 522 may be the same as CAN bus 422 in FIG. 4, and it is labeled differently herein only for illustration purposes.

The sensors 512, some or all of which may be the same as sensors 412 of FIG. 4, may be configured to collect data such as driver signals indicative of actions of the driver regarding operation of the vehicle 404, vehicle state signals, and road environment data. The sensors 512 are configured to communicate the measured sensor data to the control unit 518 via the CAN bus 522.

The driver signals may comprise signals such as a brake pedal position signal, a throttle pedal position signal, a steering angle signal, input received via input controls at a vehicle dashboard, etc. Non-limiting examples of vehicle state signals may comprise a wheel speed signal, a vehicle accelerometer signal a yaw rate signal, and a rollrate signal. The road environment data may comprise signals related to a road environment such as, e.g., a vehicle position signal e.g. a vehicle GPS position, a road inclination, a road surface index, and others. The road environment data, along with the acquired vehicle state signals may be used to classify a route that may be traveled by the vehicle, a route classification may include one or more of a hilly road, hilly highway, lane highway, interstate highway, flat terrain, unpaved road, poor road surface, flat road surface, mining quarry, port of harbor, rural road, city road, offroad, etc. The current, previously acquired, and/or predicted road environment data may be used to generate a route information for the vehicle. The route information may additionally or alternatively be acquired from a source other than the vehicle. For example, a GPS system may be used to acquire known information about one or more routes that may be traveled by the vehicle.

The sensor data acquired from the sensors 512 may be provided to PPM 529 and NNM 534. The PPM 529 may be configured to process the sensor data based on a physics based model, and to generate a physics-model based input comprising a physics-based route classification, application classification, and driver style classification. In some implementations, two or more separate PPMs may be used to generate a physics-based route classification, a physics-based application classification, and a physics-based driver style classification. In some embodiments, the physics-based processing of the sensor data acquired during a certain time period may involve using Fast Fourier Transform (FFT), e.g., according to the Welch's method, of the measured sensor data MSD, measured during said period of time.

The NNM 534 may be configured to generate a neural network output comprising a machine learning route classification, application classification, and driver style classification. In some implementations, two or more separate NNMs may be used to generate a machine learning route classification, a machine learning application classification, and a machine learning driver style classification. The NNM 534 may be trained to predict a neural network output comprising a driving style classification such as, e.g., driving style selected among such categories as rash, smooth, conservative, and dangerous. The categories may be such that they reflect a safety aspect of the driving or they may characterize a driver's style that is not necessarily related to safety. Different persons may have different driving behavior that may affect the speed of wear and tear of the vehicle and its components. Thus, for example, if a driver of a vehicle is determined to brake frequently, brakes of the vehicle may wear out faster than in a similar vehicle operated, for a similar application, by a driver who has a smoother driving style.

As an example, after sensor data acquired from the vehicle is processed using FFT signal processing, power provided by a FFT output from throttle, brake and vehicle speed data processing may exceed certain limit(s), indicating that that the driver has been accelerating and braking frequently, in a rash manner. Similarly, in response to a steering input, the FFT output power may be more than a certain threshold value thus indicating that the driver is frequently, more than would reasonably be required, changing lanes. Such threshold value may be set based on various factors, e.g., a type of a road (e.g., hills, mountains, or a highway) and location information. In some embodiments, the PPM 529 may provide a physics-based driver style classification that belongs to one or more of unsafe lane change, frequent lane changes, safe steering, harsh late braking, safe braking, rapid throttle control, smooth throttle control, good vehicle speed limit maintenance, poor speed limit maintenance, etc. In some embodiments, the PPM 529 may provide a physics-based route classification that belongs to one or more of a hilly road, a highway (with a certain number of lanes), an interstate highway, a city road, a flat terrain, an unpaved road, a poor road surface, etc. Any other classifications may be used additionally or alternatively.

NNM 534 may be configured to generate a machine learning route classification and a machine learning driver style classification using the same or similar types of categories as described in above for the PPM 529.

As shown in FIG. 5, the physics-based route, application, and driver style classification, as well as machine learning route, application, and driver style classification, may be provided to the feedback module (FM) 544. The use of both the physics-based models and machine-learning models allows advantageously combining the physics-based and data-driven approaches. The FM 544 may be configured to provide a final route, application, and driver style classification 118, also shown in FIG. 1B, which may be used in accordance with embodiments herein for fleet optimization. In some embodiments, the route, application, and driver style classification control unit 518 may be configured to update the final route, application, and driver style classification 118 based on computational simulations.

Accordingly, in some embodiments, as shown in FIG. 5, the output of the FM 544, such as the final route, application, and driver style classification 118, may be provided to an emulation module or emulator 538. The final route, application, and driver style classification 118 may be associated with driver input signals such as driver input related to steering, throttle, brakes, and other input that corresponds to the generated classification. In other words, these may be values of various parameters related to input expected to be received from the driver with respect to steering, throttle, brakes, and other components of the vehicle, when a driver is operating the vehicle for a certain application, at a certain route, and using a certain driving or driver style. These driver input signals may be emulated in the emulator 538, to verify whether the final route, application, and driver style classification 118 was determined correctly. An output of the emulator 538 is provided to the VSM 528, which may also receive sensor data as shown in FIG. 5 and which is configured to simulate one of more subsystems of the vehicle, or the entire vehicle, and to output simulated vehicle state signals such as, e.g., yaw rate, lateral acceleration, etc., which may be similar to actual vehicle state signals that may be acquired via the CAN bus 522. The VSM 528 may be configured to generate the simulated vehicle state signals based on the emulated driver input signals received by the VSM 528 from the emulator 538. The VSM 528 may additionally receive actual (e.g., actual, measured sensor data) and simulated road environmental data such as, e.g., a road surface, inclination, vehicle position, etc.

In some embodiments, the emulated driver input signals, the simulated vehicle state signals, and the environment data may be provided to the PPM 529 and to the NNM 534, where this data may be processed similar to the measured sensor data, to produce simulated physics-based route, application, and driver style classification (using the PPM 529), and simulated machine-learning route, application, and driver style classification (using the NNM 534). The FM 544 may then compare the previously generated, based on the measured sensor data, physics-based and machine-learning route, application, and driver style classifications, with respective simulated physics-based and machine-learning route, application, and driver style classifications. The comparison may be used to determine the accuracy of the determination of the previously generated physics-based and machine-learning route, application, and driver style classifications. If the classifications generated based on the simulated data deviate from the classifications generated based on the actual sensor data, it may be determined that the previously generated, referred to as final, route, application, and driver style classifications, may need to be recomputed and/or adjusted. For example, it may be determined that further sensor data may need to be collected, model(s) used may need to be adjusted, and/or other actions may need to be taken. If however the classifications generated based on the simulated data are close to the classifications generated based on the actual sensor data, the final route, application, and driver style classifications 118 may be provided as an output of the control unit 518. It should however be appreciated that the route, application, and driver style information may be updated continuously, as further sensor data is acquired, certain conditions change, etc.

The route, application, and driver style classification control unit 518 of FIG. 5 may be an electronics control unit that may be included in the vehicle 404. The control unit 518 may comprise memory and a processing circuit e.g. at least one processor configured to execute computer-executable instructions stored in the memory, to perform the processing to provide the route, application, and driver style classifications 118.

It should be appreciated that the route, application, and driver style classification control unit 518 is shown in FIG. 5 as an example only, as the route, application, and driver style classifications 118 may be generated in any other suitable way, e.g., using one or more control units which may have a configuration different from that shown in FIG. 5. Furthermore, in some cases, one or more of the route, application, and driver style classification may be determined using a control unit, simulator, and/or other component(s) that, at least in part, may not be included in the vehicle 404.

It should also be appreciated that the (first) vehicle 404 illustrated in FIGS. 4 and 5 may include various other components and control units that are not shown in FIGS. 4 and 5.

Figure 6A:
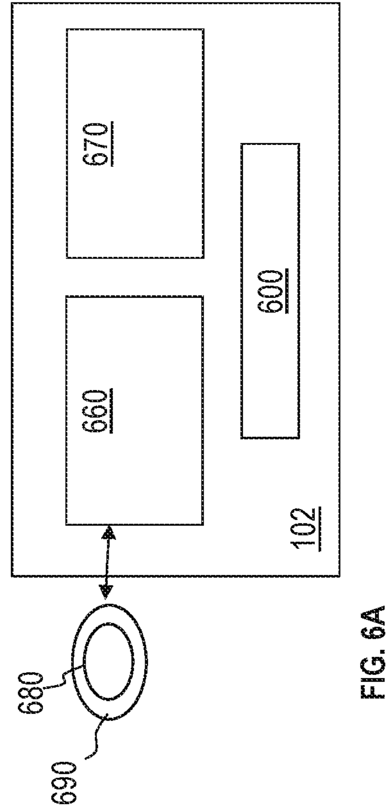
FIGS. 6A and 6B are block diagrams illustrating an example of a fleet dynamics controller, in accordance with aspects of the present disclosure.
Figure 6B:
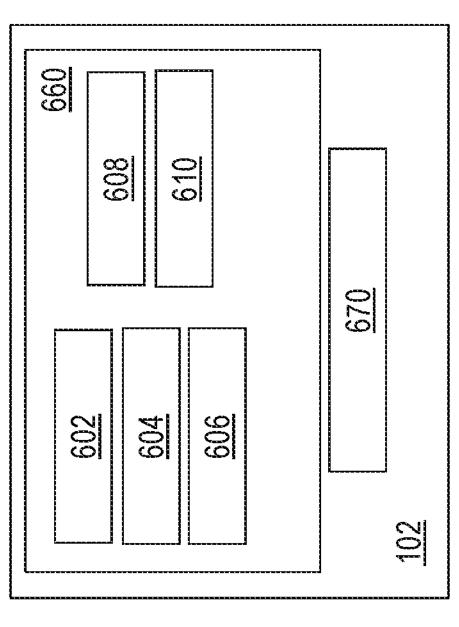

FIGS. 6A and 6B illustrate an example of an arrangement of a controller configured to perform the method in accordance with embodiments of the present disclosure, such as the fleet dynamics controller 102 of the fleet management system 100 of FIG. 1B. The fleet dynamics controller 102 may be located entirely or in part, e.g. some of its components, on a cloud. In some embodiments, memory storage device(s) and processing circuitry of the fleet dynamics controller 102 may be located on the cloud.

As shown in FIG. 6A, the fleet dynamics controller 102 may comprise an input and output interface 600, processing circuitry 660, and memory 670. The input and output interface 600 may be configured to communicate with any necessary components of embodiments herein. The input and output interface 600 may comprise a wireless and/or wired receiver, transmitter, and/or transceiver. The fleet dynamics controller 102 may use the input and output interface 600 to control and communicate with various components of the fleet management system, including vehicles in the fleet, any one or more out of wireless communications, a Controller Area Network (CAN), ethernet cables, Wi-Fi, Bluetooth, and other network interfaces. When implemented remotely e.g., on a cloud server, the fleet dynamics controller 102 may communicate with its components, such as storage device(s), as well as other devices or systems, via wireless communications.

The methods for controlling operation of a fleet of vehicles, in accordance with embodiments herein, may be implemented through the processing circuitry 660, e.g., one or more processors, together with the memory 670.

The memory 670 may comprise one or more memory units. The memory 670 comprises computer-executable instructions executable by the processing circuitry 660 and the memory 670 is configured to store, e.g., information, data, etc., to perform the methods in accordance with embodiments herein, when being executed by the processing circuitry 660. The memory 670 may be included in the fleet dynamics controller 102, or it may be an external memory. Also, the fleet dynamics controller 102 may obtain data from its memory and may additionally obtain data from an external memory.

The methods according to embodiments described herein may be implemented by means of e.g. a computer program product 680 or a computer program, comprising instructions, i.e., software code portions, which, when executed on at least one processor, e.g., the processing circuitry 660, cause the at least one processor to carry out the actions described herein, as performed by the fleet dynamics controller 102.

In some embodiments, a computer-readable storage medium 690 stores the computer program product 680. The computer-readable storage medium 690 may be, e.g., a disc, a universal serial bus (USB) stick, or similar, carrying computer program code for performing the method in accordance with embodiments herein. The computer-readable storage medium 690, having stored thereon the computer program product 680, may comprise the instructions which, when executed on at least one processor, e.g., the processing circuitry 660, cause the at least one processor to carry out the actions of the method described herein, as performed by the fleet dynamics controller 102.

As shown in FIG. 6B, the fleet dynamics controller 102 may comprise an acquiring unit 602. The fleet dynamics controller 102, the processing circuitry 660, and/or the acquiring unit 602 may be configured to acquire first sensor data from a plurality of first sensors of a first vehicle of the fleet of vehicles, and second sensor data from a plurality of second sensors of a second vehicle of the fleet of vehicle. The first vehicle comprises a plurality of first components and the second vehicle comprises a plurality of second components. The components of the first and second vehicles may be part of respective one or more subsystems of these vehicles. For example, in some embodiments, the plurality of first components of the first vehicle comprise one or more components of tires, a steering wheel system, a brake system, a transmission system, a suspension system, an aerodynamics system, and a powertrain system. In some embodiments, the plurality of second components of the second vehicle comprise one or more components of tires, a steering wheel system, a brake system, a transmission system, a suspension system, an aerodynamics system, and a powertrain system.

The fleet dynamics controller 102, the processing circuitry 660, and/or the acquiring unit 602 may also be configured to acquire subsequent first sensor data from the plurality of first sensors of the first vehicle with a first redistributed component of the component redistribution, and subsequent second sensor data from the plurality of second sensors of the second vehicle with a second redistributed component of the component redistribution. The fleet dynamics controller 102, the processing circuitry 660, and/or the acquiring unit 602 may thus be configured to repeatedly acquire sensor data from the respective sensors of the first and second vehicles. The first sensor data and the second sensor data may be stored in a cloud fleet database. Also, the subsequent first sensor data and the subsequent second sensor data may be stored in the cloud fleet database.

In some embodiments, the first sensor data, acquired from the plurality of first sensors of the first vehicle of the fleet of vehicles, comprises driver input signals of the first vehicle. The second sensor data, acquired from the plurality of second sensors of the second vehicle of the fleet of vehicles, comprises driver input signals of the second vehicle. The subsequent first and second sensor may be similar to the previously acquired first and second sensor.

The fleet dynamics controller 102 may comprise a processing unit 604. The fleet dynamics controller 102, the processing circuitry 660, and/or the processing unit 604 may be configured to process the first sensor data using a first vehicle dynamics model to estimate at least one first vehicle operating cost parameter value related to operation of the first vehicle, and to process the second sensor data using a second vehicle dynamics model to estimate at least one second vehicle operating cost parameter value related to operation of the second vehicle. In some embodiments, the first vehicle dynamics model estimates the value of the at least one first vehicle operating cost parameter value by considering that a first component from the plurality of first components of the first vehicle is replaced with a corresponding second component of the second vehicle. The second vehicle dynamics model may estimate the value of the at least one second vehicle operating cost parameter value by considering that the second component from the plurality of second components of the second vehicle is replaced with the corresponding first component of the first vehicle.

In some embodiments, the first vehicle dynamics model and the second vehicle dynamics model are included in a simulator. The simulator may be a suitable vehicle physics and dynamics simulator which may be implemented in software, hardware, firmware, or a combination thereof.

The fleet dynamics controller 102, the processing circuitry 660, and/or the processing unit 604 may also be configured to process the first vehicle operating cost parameter value and the second vehicle operating cost parameter value using a reinforcement learning model, e.g., RL model 142 of FIG. 1B, to estimate at least one fleet operating cost parameter value related to operation of the fleet of vehicles. In some embodiments, the first vehicle operating cost parameter value and the second vehicle operating cost parameter value may be weighted in model-based RL learning, such as the RL model, to determine a value of the fleet operating cost parameter. The at least one fleet operating cost parameter value may comprise a value of one or more of fuel economy in the fleet of vehicles, operational efficiency of the fleet of vehicles, downtime of one or more vehicles in the fleet of vehicles, ride comfort of one or more vehicles in the fleet of vehicles, and a component wear of one or more vehicles in the fleet of vehicles. Any other fleet operating cost parameters may be employed, and their values may be estimated using the techniques in accordance with embodiments of the present disclosure.

In some embodiments, the first sensor data may be processed to determine one or more of an application of the first vehicle, a route for the first vehicle, and a driver style classification of a driving style of a driver of the first vehicle; and the second sensor may be processed to determine one or more of an application of the second vehicle, a route for the second vehicle, and a driver style classification of a driving style of a driver of the second vehicle.

The fleet dynamics controller 102, the processing circuitry 660, and/or the processing unit 604 may be configured to process the first sensor data and the second sensor data to determine one or more of an application, a route, and a driver style classification of a driving style of a driver of one or both the first and second vehicles. In some embodiments, processing circuitry of the first vehicle is configured to process the first sensor data to determine one or more of the application of the first vehicle, the route for the first vehicle, and the driver style classification of the driving style of the driver of the first vehicle. Similarly, in some embodiments, processing circuitry of the second vehicle is configured to process the second sensor data to determine one or more of the application of the second vehicle, the route for the second vehicle, and the driver style classification of the driving style of the driver of the second vehicle.

In some embodiments, the first sensor data is processed to generate a health status of at least one subsystem of the first vehicle, and the second sensor data is processed to generate a health status of at least one subsystem of the second vehicle. The fleet dynamics controller 102, the processing circuitry 660, and/or the processing unit 604 may be configured to process the first sensor data and the second sensor data.

In some embodiments, the first vehicle dynamics model may use one or more of the application of the first vehicle, the route for the first vehicle, the driver style classification of the driving style of the driver of the first vehicle, and the health status of the at least one subsystem of the first vehicle to estimate the at least one first vehicle operating cost parameter value. In some embodiments, the second vehicle dynamics model may use one or more of the application of the second vehicle, the route for the second vehicle, the driver style classification of the driving style of the driver of the second vehicle, and the health status of the at least one subsystem of the second vehicle to estimate the at least one second vehicle operating cost parameter value.

As further shown in FIG. 6B, the fleet dynamics controller 102 may comprise a determining unit 606. The fleet dynamics controller 102, the processing circuitry 660, and/or the determining unit 606 may be configured to determine a recommended component redistribution of the first vehicle to the second vehicle to optimize the at least one estimated fleet operating cost parameter value.

The fleet dynamics controller 102 may comprise a sending unit 608. The fleet dynamics controller 102, the processing circuitry 660, and/or the sending unit 608 may be configured to send the recommended component redistribution at least to the first vehicle and the second vehicle.

The fleet dynamics controller 102, the processing circuitry 660, and/or the sending unit 608 may be configured to provide the recommended component redistribution from the reinforcement learning model to a fleet management controller that generates a signal instructing implementation of the recommended component redistribution of the first vehicle to the second vehicle.

The fleet dynamics controller 102 may comprise a generating unit 610. The fleet dynamics controller 102, the processing circuitry 660, and/or the generating unit 610 may be configured to generate an indication indicating whether or not the recommended component redistribution optimized the at least one estimated fleet operating cost parameter value. The indication may be generated by a feedback module, e.g., feedback module 144 of FIG. 1B, that provides the indication to the reinforcement learning model. In some embodiments, if the indication indicates that the recommended component redistribution optimized the at least one estimated fleet operating cost parameter value, the subsequent recommended component redistribution may be determined using the recommended component redistribution. In some embodiments, the indication indicates that the recommended component redistribution did not optimize the at least one estimated fleet operating cost parameter value, the subsequent recommended component redistribution may be determined using an alternative recommended component redistribution. The recommended component redistribution may comprise one or more component redistributions, and the alternative component redistribution may be a next best, i.e. associated with a next highest value of a fleet operating cost parameter, redistribution among the calculated component redistributions.

The fleet dynamics controller 102, the processing circuitry 660, and/or the determining unit 606 may be configured to determine, by the reinforcement learning model, a subsequent recommended component redistribution of the first vehicle to the second vehicle, the subsequent recommended component redistribution optimizing the at least one estimated fleet operating cost parameter value.

As shown in FIG. 6B, the units of the fleet dynamics controller 102 may be included in and/or executed by the processing circuitry 660. However, embodiments of the present disclosure are not limited to any specific location of the units of the fleet dynamics controller 102.

Those skilled in the art will appreciate that the units of the fleet dynamics controller 102 described above may refer to a combination of analogue and digital circuits, and/or one or more processors configured with software and/or firmware, e.g., stored in the fleet dynamics controller 102, that, when executed by the respective one or more processors such as the processors described above, may carry out the actions or steps of the method(s) in accordance with the present disclosure. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip. Furthermore, at least some of the units of the fleet dynamics controller 102 may be cloud units in a cloud network.

Figure 7:
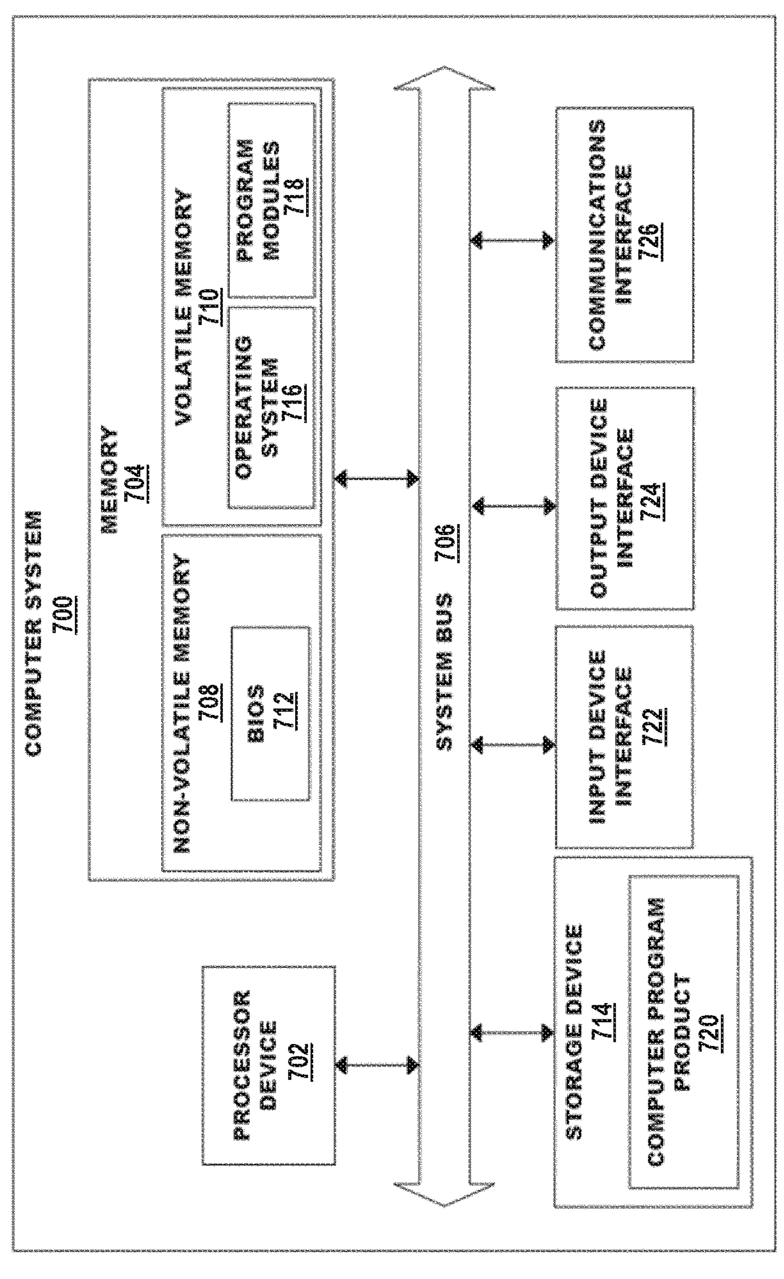
FIG. 7 is a schematic diagram of an exemplary computer system for implementing examples disclosed herein.

FIG. 7 is a schematic diagram of a computer system 700 for implementing examples disclosed herein. The computer system 700 may be used to implement a fleet controller such as, e.g., fleet dynamics controller 20 (FIG. 1A) or 102 (FIG. 1B). One or more components of the computer system 700 may be cloud components.

The computer system 700 may be adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein.

The computer system 700 may comprise any computing or electronic device capable of including firmware, hardware, and/or executing software instructions to implement the functionality described herein. The computer system 700 includes a processor device 702 (may also be referred to as a control unit), a memory 704, and a system bus 706. The system bus 706 provides an interface for system components including, but not limited to, the memory 704 and the processor device 702. The processor device 702 may include any number of hardware components for conducting data or signal processing or for executing computer code stored in memory 704. The processor device 702 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures.

The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computing device 700.

The computing device 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be stored in the storage device 714 and in the volatile memory 710, including an operating system 716 and one or more program modules 718, which may implement the functionality described herein in whole or in part. All or a portion of the examples disclosed herein may be implemented as a computer program product 720 stored on a transitory or non-transitory computer-usable or computer-readable storage medium (i.e., single medium or multiple media), such as the storage device 714, which includes complex programming instructions, such as complex computer-readable program code, to cause the processor device 702 to carry out the steps described herein. Thus, the computer-readable program code can comprise software instructions for implementing the functionality of the examples described herein when executed by the processor device 702. The processor device 702 may serve as a controller, or control system, for the computing device 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computing device 700 may also include a communications interface 726 suitable for communicating with a network as appropriate or desired.

Aspects set forth above represent the necessary information to enable those skilled in the art to practice the disclosure and illustrate the best mode of practicing thereof.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method of controlling operation and performance of a fleet of vehicles, the method comprising:

acquiring sensor data from a plurality of sensors for measuring performance of a vehicle, wherein the sensor data includes first sensor data from a plurality of first sensors of a first vehicle of a fleet of vehicles, and second sensor data from a plurality of second sensors of a second vehicle of the fleet of vehicles, the first vehicle comprising a plurality of first components each associated with one of the plurality of first sensors and the second vehicle comprising a plurality of second components each associated with one of the plurality of second sensors;

processing the first sensor data using a first vehicle dynamics model to estimate at least one first vehicle operating cost parameter value related to performance of the first vehicle;

processing the second sensor data using a second vehicle dynamics model to estimate at least one second vehicle operating cost parameter value related to performance of the second vehicle;

processing the first vehicle operating cost parameter value and the second vehicle operating cost parameter value using a reinforcement learning model to estimate at least one fleet operating cost parameter value related to operation of the fleet of vehicles, wherein the first vehicle dynamics model estimates the value of the at least one first vehicle operating cost parameter value by considering that a first component from the plurality of first components of the first vehicle is replaced with a corresponding second component of the second vehicle, and wherein the second vehicle dynamics model estimates the value of the at least one second vehicle operating cost parameter value by considering that the second component from the plurality of second components of the second vehicle is replaced with the corresponding first component of the first vehicle;

determining a recommended component redistribution of the first vehicle to the second vehicle to optimize the at least one estimated fleet operating cost parameter value; and implementing the recommended component redistribution to optimize the operation and performance of the fleet of vehicles.

2. The method of claim 1, further comprising:

acquiring subsequent first sensor data from the plurality of first sensors of the first vehicle with a first redistributed component of the component redistribution, and subsequent second sensor data from the plurality of second sensors of the second vehicle with a second redistributed component of the component redistribution;

generating an indication indicating whether or not the recommended component redistribution optimized the at least one estimated fleet operating cost parameter value; and determining, by the reinforcement learning model, a subsequent recommended component redistribution of the first vehicle to the second vehicle, the subsequent recommended component redistribution optimizing the at least one estimated fleet operating cost parameter value.

3. The method of claim 2, wherein the indication is generated by a feedback module that provides the indication to the reinforcement learning model.

4. The method of claim 2, wherein, if the indication indicates that the recommended component redistribution optimized the at least one estimated fleet operating cost parameter value, the subsequent recommended component redistribution is determined using the recommended component redistribution.

5. The method of claim 2, wherein, if the indication indicates that the recommended component redistribution did not optimize the at least one estimated fleet operating cost parameter value, the subsequent recommended component redistribution is determined using an alternative recommended component redistribution.

6. The method of claim 1, wherein the first vehicle dynamics model and the second vehicle dynamics model are included in a simulator.

7. The method of claim 1, further comprising:

providing the recommended component redistribution from the reinforcement learning model to a fleet management controller that generates a signal instructing implementation of the recommended component redistribution of the first vehicle to the second vehicle.

8. The method of claim 1, wherein the first sensor data comprises driver input signals of the first vehicle; and the second sensor data comprises driver input signals of the second vehicle.

9. The method of claim 8, wherein the first sensor data is processed to determine one or more of an application of the first vehicle, a route for the first vehicle, and a driver style classification of a driving style of a driver of the first vehicle; and the second sensor data is processed to determine one or more of an application of the second vehicle, a route for the second vehicle, and a driver style classification of a driving style of a driver of the second vehicle.

10. The method of claim 8, wherein the first sensor data is processed to generate a health status of at least one subsystem of the first vehicle; and the second sensor data is processed to generate a health status of at least one subsystem of the second vehicle.

11. The method of claim 9, wherein the first vehicle dynamics model uses one or more of the application of the first vehicle, the route for the first vehicle, the driver style classification of the driving style of the driver of the first vehicle, and the health status of the at least one subsystem of the first vehicle to estimate the at least one first vehicle operating cost parameter value; and the second vehicle dynamics model uses one or more of the application of the second vehicle, the route for the second vehicle, the driver style classification of the driving style of the driver of the second vehicle, and the health status of the at least one subsystem of the second vehicle to estimate the at least one second vehicle operating cost parameter value.

12. The method of claim 1, wherein the first sensor data and the second sensor data are stored in a cloud fleet database.

13. The method of claim 1, wherein the at least one fleet operating cost parameter value comprises a value of one or more of fuel economy in the fleet of vehicles, operational efficiency of the fleet of vehicles, downtime of one or more vehicles in the fleet of vehicles, ride comfort of one or more vehicles in the fleet of vehicles, and a component wear of one or more vehicles in the fleet of vehicles.

14. The method of claim 1, wherein the plurality of first components of the first vehicle comprise one or more components of tires, a steering wheel system, a brake system, a transmission system, a suspension system, an aerodynamics system, and a powertrain system; and the plurality of second components of the second vehicle comprise one or more components of tires, a steering wheel system, a brake system, a transmission system, a suspension system, an aerodynamics system, and a powertrain system.

15. A fleet management system comprising at least one processor executing instructions stored on a non-transitory computer-readable storage medium to control the operation and performance of a fleet of vehicles; and a fleet dynamics controller for controlling the operation and performance of the fleet of vehicles, the fleet management system being configured to perform the method claim 1.

16. A non-transitory computer-readable storage medium, having stored thereon a computer program product comprising instructions which, when executed on at least one processor, cause the at least one processor to carry out the method of claim 1.

* * * * *